(12) United States Patent
Bleth et al.

(10) Patent No.: US 6,428,656 B1
(45) Date of Patent: Aug. 6, 2002

(54) WATER-COOLED DISTILLING APPARATUS

(75) Inventors: Joel J. Bleth, Dickinson, ND (US); Edward T. Strickland, Kaneohe, HI (US); Doug Walter, Dickinson, ND (US)

(73) Assignee: PSI-ETS, a North Dakota Partnership, Dickinson, ND (US)

( * ) Notice: Subject to any disclaimer, the term of this patent is extended or adjusted under 35 U.S.C. 154(b) by 0 days.

(21) Appl. No.: 09/505,651

(22) Filed: Feb. 17, 2000

Related U.S. Application Data
(60) Provisional application No. 60/120,579, filed on Feb. 18, 1999.

(51) Int. Cl.$^7$ ................................................. B01D 3/02
(52) U.S. Cl. ................... 202/185.1; 202/186; 202/189; 202/190; 202/197; 202/202; 203/10; 203/40
(58) Field of Search ............................. 202/185.1, 186, 202/189, 190, 197, 202; 203/1, 10, 40

(56) References Cited

U.S. PATENT DOCUMENTS

| | | |
|---|---|---|
| 556,157 A | 3/1896 | Minor |
| 627,904 A | 6/1899 | Chase |
| 634,556 A | 10/1899 | Hale |
| 642,616 A | 2/1900 | Lee |
| 662,765 A | 11/1900 | Chase |
| 669,966 A | 3/1901 | Rose |
| 725,182 A | 4/1903 | Van Ausdal |
| 744,367 A | 11/1903 | DeLautreppe |
| 755,179 A | 3/1904 | Smith |
| 825,178 A | 7/1906 | Barnstead |
| 829,999 A | 9/1906 | Parker |
| 1,148,273 A | 7/1915 | Adams |
| 1,893,340 A | 1/1933 | Schlumbohm |
| 2,398,842 A | 4/1946 | Morse |
| 2,880,146 A | 3/1959 | West |
| 3,442,765 A | 5/1969 | Levite |
| 3,536,591 A | 10/1970 | Lotz |

(List continued on next page.)

FOREIGN PATENT DOCUMENTS

| | | |
|---|---|---|
| FR | 370537 | 2/1907 |
| GB | 448870 | 3/1975 |
| JP | 59-166204 | 9/1984 |
| WO | WO 95/24956 | 9/1995 |

OTHER PUBLICATIONS

Watertanks.Com, Life Saver Water Distiller, Internet Article, Nov. 19, 1999, pp. 1–4, Dexter, ME, USA http://www.watertanks.com/distiller.html.

Pure Water, Inc., Survival emergency distilled drinking water system PureSurvival.com, Internet Article, Feb. 14, 2000, pp. 1–8, USA, http://www.puresurvival.com/products.htm.

*Primary Examiner*—Jerry D. Johnson
*Assistant Examiner*—Frederick Varcoe
(74) *Attorney, Agent, or Firm*—W. Scott Carson

(57) ABSTRACT

A water-cooled distilling apparatus for purifying or distilling raw water. The apparatus includes a boiler, cooling tray assembly, and collection vessel. In use, raw water is initially poured into the boiler which has a self-regulating screen in it. As the water beings to boil, the screen rises to float above the raw water. The height of the screen above the water automatically adjusts proportionately to the rate of boil to proportionately expose more or less surface area of the screen. A water film forms on the exposed surface area of the screen and clean steam rises therefrom into the cooling tray assembly where it is deflected into a condensing area on each level of the assembly. In each condensing area, heat is transferred from the steam into coolant water in a reservoir, causing the coolant water to evaporate from the reservoir and the steam to condense on the bottom of the surface of the reservoir. Distillate formed by the condensing steam is then collected and transferred to a collection vessel.

40 Claims, 13 Drawing Sheets

U.S. PATENT DOCUMENTS

| | | | |
|---|---|---|---|
| 3,664,928 A | * | 5/1972 | Roberts .................. 202/236 |
| 3,694,321 A | | 9/1972 | Marovich et al. |
| 3,784,450 A | | 1/1974 | Van Hengel |
| 3,830,705 A | | 8/1974 | Dewegeli |
| 3,875,988 A | | 4/1975 | Machida et al. |
| 4,045,293 A | | 8/1977 | Cooksley |
| 4,052,267 A | | 10/1977 | McFee |
| 4,167,437 A | | 9/1979 | Gilbert |
| 4,187,150 A | | 2/1980 | Rich |
| 4,350,568 A | | 9/1982 | Dalupan |
| 4,743,343 A | * | 5/1988 | Sakai ..................... 203/22 |
| 4,882,012 A | | 11/1989 | Wasserman |
| 5,030,327 A | | 7/1991 | Lee |
| 5,094,721 A | | 3/1992 | Petrek |
| 5,205,909 A | | 4/1993 | Smith |
| 5,348,623 A | | 9/1994 | Salmon |
| 5,464,531 A | | 11/1995 | Greene |
| 5,565,065 A | * | 10/1996 | Wang ..................... 202/176 |
| 5,587,055 A | | 12/1996 | Hartman et al. |
| 5,609,732 A | * | 3/1997 | Magison .................. 202/83 |
| 5,614,066 A | * | 3/1997 | Williamson .............. 202/182 |
| 5,632,864 A | | 5/1997 | Enneper |
| 5,932,073 A | * | 8/1999 | Land ..................... 202/185.3 |
| 6,193,849 B1 | * | 2/2001 | Lockett, Jr. |

\* cited by examiner

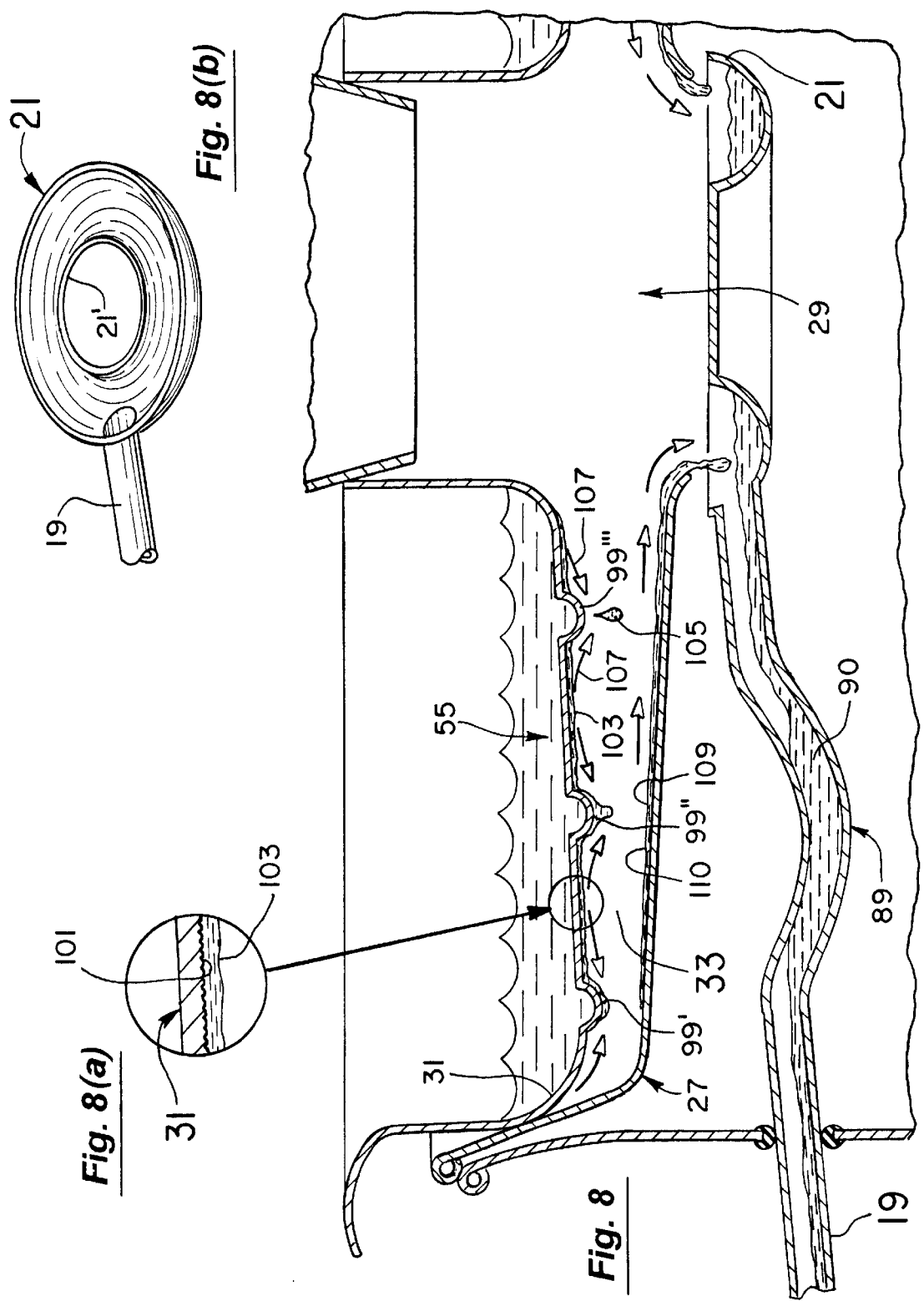

WATER-COOLED DISTILLING APPARATUS

RELATED APPLICATION

This application claims the benefit of U.S. Provisional Patent Application Serial No. 60/120,579 filed Feb. 18, 1999.

BACKGROUND OF THE INVENTION

1. Field of the Invention

The present invention relates generally to the field of water purifiers and more specifically to the field of water-cooled distilling apparatuses.

2. Statement of the Problem

In many areas of the world, tap water is not suitable for human consumption. This is true in numerous third world countries and even in developed countries like the United States when a water treatment facility fails due to equipment malfunctions or natural disasters. In such cases, harmful chemical and biological contaminants must be removed before the water can be safely consumed.

Methods and apparatuses are available to help remove these harmful contaminants from the water, including the use of carbon filters, ultra-violet (UV) light, ozone, and reverse osmosis (RO). However, these methods are often expensive and/or require extensive maintenance. Many of them also do not remove all of the contaminants or are inefficient. Alternatively, bottled water can be purchased; however, bottled water is expensive and not always available. In addition, the quality itself of some bottled water may be questionable.

Another option is to remove these contaminants from the water by distillation. There are three general categories of conventional distillers: (1) air-cooled distillers that cool and condense the steam using airflow, (2) high volume water-cooled distillers that cool and condense the steam by heating up large volumes (e.g., seven gallons) of coolant water to produce one gallon of distillate, and (3) hybrid water-cooled distillers that use moderate volumes (e.g., three to five gallons) of coolant water that is heated up and partially evaporated to produce one gallon of distillate. Distillation is acknowledged by most experts to reliably produce the best quality water (typically 99.9% pure). However, despite their effectiveness, distillers are not widely accepted by consumers because distillers typically have slow production rates, can be loud when fans are used to cool the steam (i.e., in air-cooled distillers), and produce excessive heat in the room in which they are used. They also can be difficult to clean (e.g., mineral scale) and usually require a carbon filter to obtain the best results.

Although high volume water-cooled distillers do not produce excessive room heat, such distillers normally cool the steam by flooding the outside of the condensing chamber with a continuous stream of cold water. These distillers usually also require a dedicated 220 volt circuit, a separate water feed line, and a coolant-water waste line. In addition, the distillers typically require at least seven gallons of cold water as indicated above to condense enough steam to produce one gallon of distillate. Even then, when only seven gallons of coolant water are used, the coolant water is usually so hot (about 200° F.) that it can damage household sewer pipes. Therefore, most water-cooled distillers commonly run ten gallons of coolant water down the drain for every one gallon of distillate produced. Though effective, such distillers can often cost anywhere from $1000 on up.

Hybrid water-cooled distillers (e.g., for use on wood stoves or camping stoves) do not use as much coolant as the high volume distiller, but they can only operate effectively at low power inputs (e.g., 1000 watts or less once the coolant water becomes hot and must be subsequently evaporated). As such, these distillers have a very low output rate (e.g., three to four hours to produce one gallon of distillate) and are typically very large, often as large as a five gallon can. In addition, these distillers do not work well on conventional household electric ranges because of the effect of digital switching. That is, when a 2500 watt electric burner is turned to the "medium" setting, the burner element does not draw 1250 watts, but instead it draws 2500 watt pulses (i.e., the burner element is switched on and off repeatedly by a thermostat) for an average of, for example, 1250 watts. However, the steam production in a distiller follows the wattage nearly instantaneously. Thus, during a pulse (.g., 2500 wafts), more steam is produced than can be handled by the distiller and must be vented and lost to the surrounding atmosphere. As a result, the efficiency declines and the volume of distillate cannot be accurately predicted (e.g., from one burner setting to the next).

3. Solution to the Problem

The water-cooled distilling apparatus of the present invention solves the problems discussed above. Specifically, the distilling apparatus of the present invention is of compact design (e.g., only 11.5 inches in diameter and height) and purifies the raw water so that it can be safely consumed. In doing so, a screen in the boiler prevents particles in the raw water from becoming entrained in the steam, thus eliminating the need for any post filtering (e.g., carbon filtration). In the preferred embodiment, no fans are required, reducing the noise and heat output into the room. Instead, heat from the steam is driven through a sufficiently large surface area into coolant water, which evaporates to the surrounding atmosphere preferably in a substantially one-to-one ratio (i.e., coolant evaporation to distillate production). This evaporation temporarily raises the humidity in the room but does not noticeably increase the temperature in the room. The distilling apparatus of the present invention also generates little, if any, waste water and eliminates the need for expensive and cumbersome drainage. It also produces distillate at a relatively high rate. Further, the distillation apparatus of the present invention can be used on any conventional household electric or gas range, with predictable production rates, and is easily disassembled (e.g., for cleaning and storage). In addition, the distilling apparatus of the present invention costs less than most conventionally available water purifiers. It also operates essentially at atmospheric pressure (e.g., typically no more than 0.01 psi above ambient pressure, which is comparable to pressures produced when cooking with conventional, covered lightweight pots and pans).

SUMMARY OF THE INVENTION

The present invention involves a water-cooled distilling apparatus for generating or forming purified water from raw or contaminated water. The raw water is placed in a boiler, preferably rated at about 2500 watts, and a self-regulating screen is placed within the boiler. The screen includes a sidewall portion that extends downwardly from a central portion and substantially about the perimeter of the central portion. Raw water is poured into the boiler and initially covers the screen (i.e., when the raw water is cooler than the boiling temperature of water). As the water beings to boil, the screen rises to the surface of the raw water and then floats above it on the steam bubles. The height of the central portion of the self-regulating screen above the raw water automatically adjusts proportionately to the rate of boil (i.e., it increases as the rate of boil increases and decreases as the rate of boil decreases). In this manner, the screen is self-regulating in that it proportionately exposes more or less surface area of the sidewall portion of the screen depending upon the rate of boil. The self-regulating screen is dimensioned to cover substantially all of the exposed raw water even at the highest rate of boil so that any particles of the raw water are prevented from passing by or around the screen and becoming entrained in and contaminating the steam rising from the screen. The central and sidewall portions of the screen provide surface area on which a water film initially forms from the raw boiling water. Secondary, clean steam is then generated from and rises from the water film on the screen.

A multi-level, cooling tray assembly in the preferred embodiment is placed over the boiler and screen and the steam rising from the screen is directed into the cooling tray assembly. Preferably, an inverted, substantially V-shaped deflector at each level in the cooling tray assembly directs the steam substantially along a predetermined path into and through a condensing area formed between a coolant water reservoir and a collection tray at each level. The steam collects on the bottom surface of each coolant water reservoir and in a preferred embodiment, the bottom surface of each coolant water reservoir is dimpled and sandblasted to facilitate steam condensation and distillate drip. Heat is transferred from the steam into each coolant water reservoir causing the coolant water to evaporate and the steam to condense. Turbulence rims on the outer perimeter of the cooling tray assembly direct the evaporation away from the cooling tray assembly so that the coolant water continues to efficiently remove heat from the steam to form distillate or purified water. The purified water drips onto and flows down each tray to a collection cup placed beneath the bottom tray immediately above the boiler and screen. The purified water exits the cup through a transfer pipe and flows to a collection vessel. Preferably, a fill alarm on the coolant vessel indicates that the purified water in it has reached a predetermined level (e.g., the vessel is full).

The distillate apparatus of the present invention preferably has two pressure and vacuum releases. In this regard, a steam release is formed at the top of the cooling tray assembly by a cover placed over a steam vent. The cover has a rim with ridges formed about its perimeter and after air in the distilling apparatus is initially driven out through it, the condensing steam fills the ridges between the cover and the steam vent and forms a water seal. The cover's water seal opens to release steam when the pressure within the boiler and the cooling tray assembly exceeds a predetermined level. The water seal around the cover is also broken to let ambient air into the cooling tray assembly and the boiler whenever a vacuum is created therein, such as when cold water is added to the coolant water reservoirs. The covered vent serves as a primary pressure and vacuum release; however, the transfer pipe preferably also has a water trap that serves as a secondary pressure and vacuum release for the distilling apparatus.

In the preferred embodiment, purified water is produced substantially at a one-to-one ratio relative to evaporation from the water coolant reservoirs. Other features of the present invention include that the screen is self-cleaning, the bottom surface of the boiler is dark colored and substantially concave to reduce heat loss, and a wave dampening baffle is provided in each coolant water reservoir. The baffle has at least two members that are pivotable about one another so that the baffle substantially conforms to the sloped floor of the coolant water reservoir. The baffle can also be used as a fill-depth guide.

These and other advantages, features, and objects of the present invention will be more readily understood in view of the following detailed description and the drawings.

BRIEF DESCRIPTION OF THE DRAWINGS

FIG. 8 is a detailed view of a portion of the cooling tray assembly of the present invention showing the formation and flow of the distillate.

FIG. 8(a) is an enlarged view of the bottom surface of the coolant water reservoir of the cooling tray assembly of FIG. 8.

FIG. 8(b) is a perspective view of the collection cup of FIG. 8.

DETAILED DESCRIPTION OF THE INVENTION

1. Overview

Figure 1:
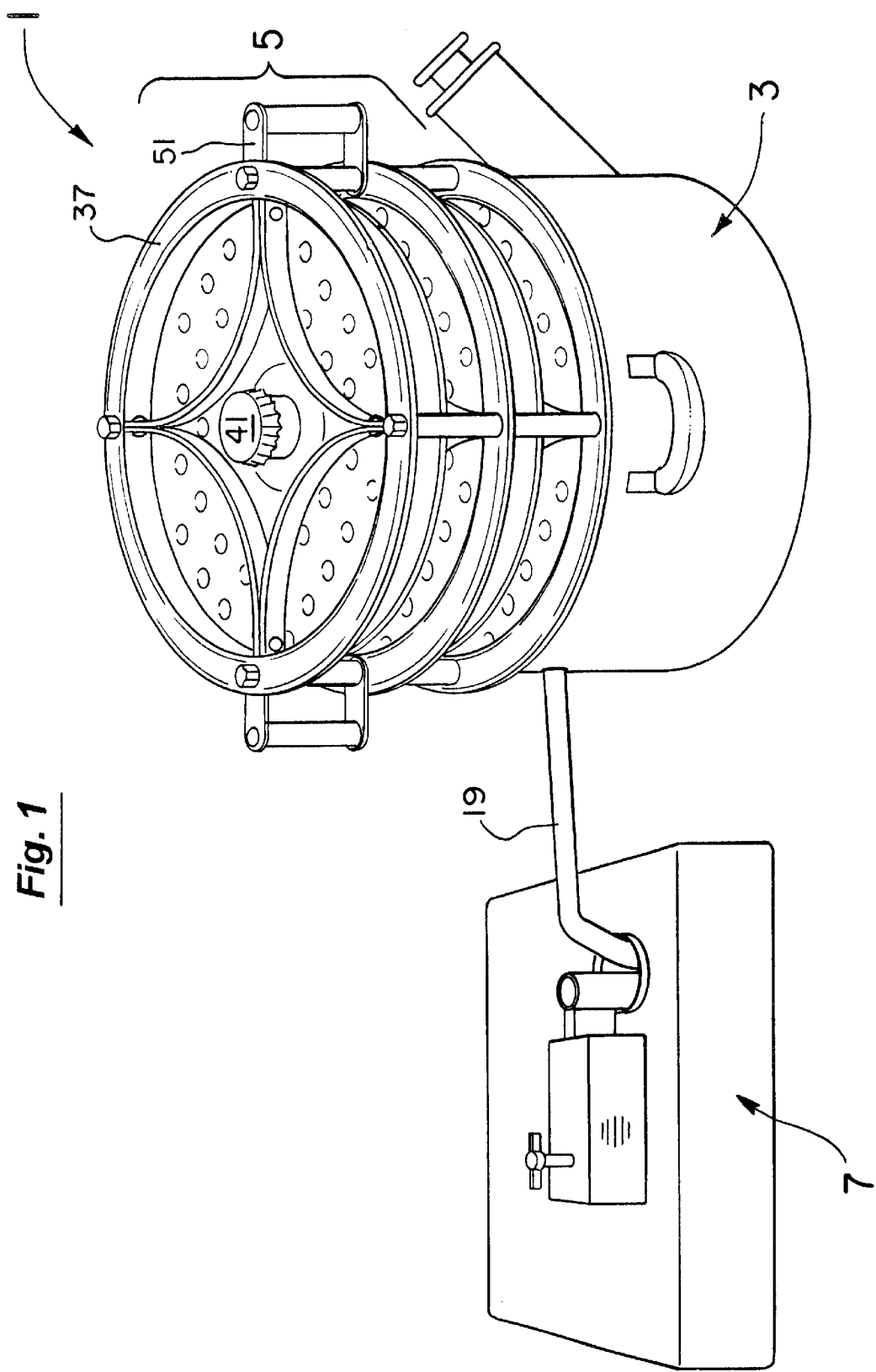
FIG. 1 is a perspective view of the distilling apparatus of the present invention.

The preferred embodiment of the water-cooled distilling apparatus 1 of the present invention is shown in FIG. 1. As illustrated, the distilling apparatus 1 has a boiler 3 with a cooling tray assembly 5 placed over the boiler 3 and a collection vessel 7 placed beside the boiler 3. In use, the boiler 3 can be placed over a burner 9 (see FIG. 3). The boiler 3 can also be disassembled from the cooling tray assembly 5 and collection vessel 7 after use (e.g., for cleaning and storage).

The distilling apparatus 1 can be used with any conventionally available burner 9 such as a household electric or gas range, propane camping stove, portable electric burner, and the like. The boiler 3 and the cooling tray assembly 5 are preferably made of stainless steel to reduce damage to the distilling apparatus 1 should an empty boiler 3 be inadvertently left on a hot burner 9. However, any suitable material can be used under the teachings of the present invention. Similarly, the distilling apparatus 1 can be arranged in other configurations than those shown, such as by placing the collection vessel 7 beneath the burner 9 (e.g., in a self-contained unit which included a burner). The collection vessel 7 could be formed as an integral unit of the boiler 3 if desired and the boiler 3 and collection vessel 7 could have any number of different shapes.

Figure 2:
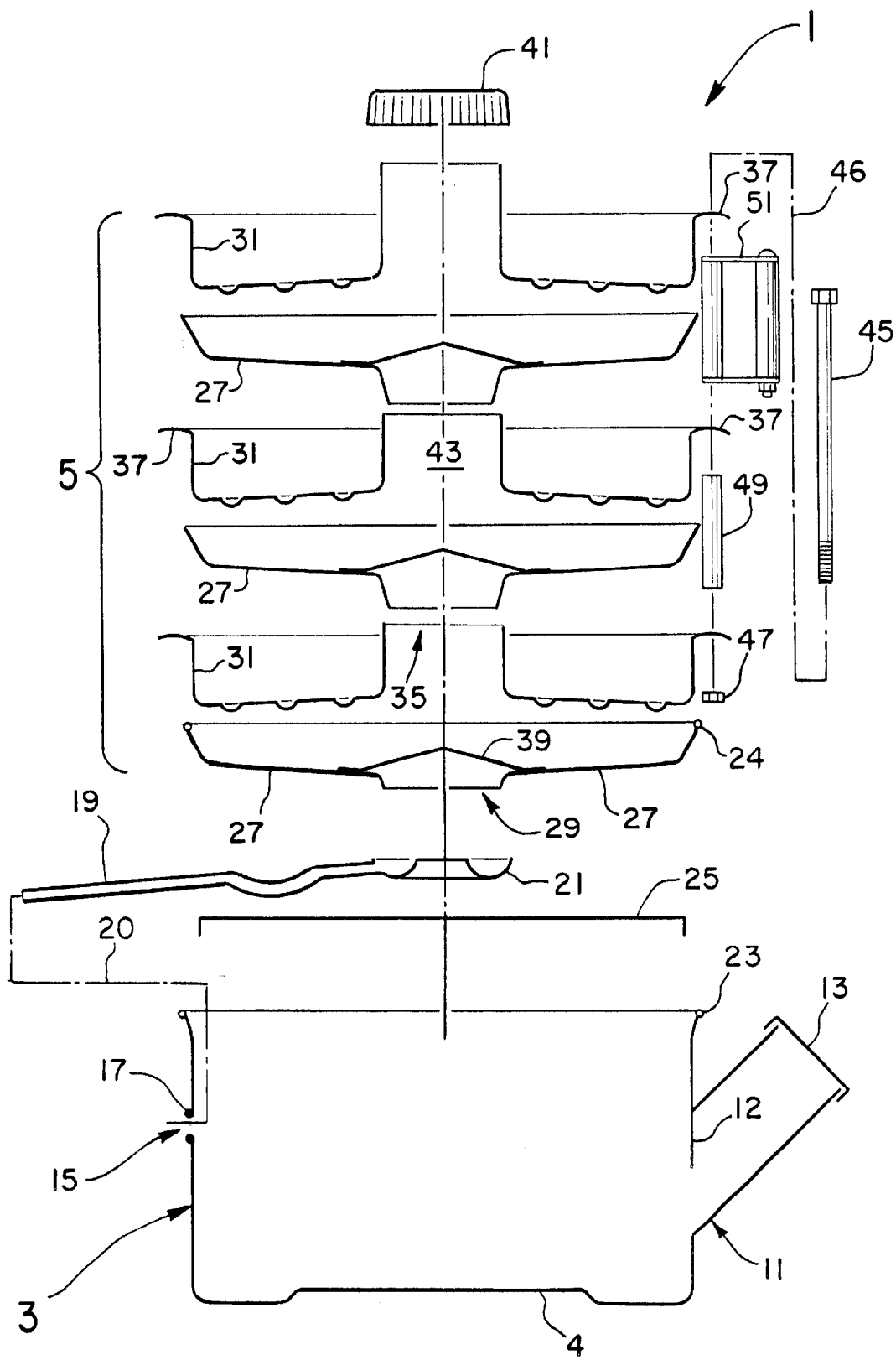
FIG. 2 is an exploded, cross-sectional view of the distilling apparatus of FIG. 1.

FIG. 2 is an exploded view showing the components of the boiler 3 and the cooling tray assembly 5 of the distilling apparatus 1. The boiler 3 has a fill spout 11 that can be closed to the surrounding atmosphere and preferably sealed with a conventionally available removable cover 13 (e.g., a screw cap with rubber gasket). The fill spout 11 provides an opening directly into the boiler 3 that allows the user to fill the boiler 3 even during use (i.e., without having to disassemble or remove the cooling tray assembly 5). The removable cover 13 ensures that steam is not lost to the surrounding atmosphere through the fill spout 11 during use. Preferably, an extension 12 of the sidewall of the boiler 3 extends downwardly and partially closes the fill spout 11 as shown in FIG. 2 to serve as a fill guide (i.e., the user adds raw water to the boiler 3 until the water level reaches the bottom portion of extension 12 amounting to, for example, approximately 4.4 liters). The boiler 3 also has an orifice 15 formed in the boiler sidewall through which a transfer pipe 19 is extended (i.e., see assembly path 20 in FIG. 2). The transfer pipe 19 helps to support the collection cup 21 in addition to providing a conduit to the collection vessel 7 of FIG. 1. Preferably, a rubber grommet 17 is inserted through the drainage orifice 15 of FIG. 2 to seal about the transfer pipe 19 so that steam is not lost from the boiler 3 to the surrounding atmosphere through the orifice 15. A self-regulating screen 25, as explained in more detail below, is placed within the boiler 3.

Figure 3:
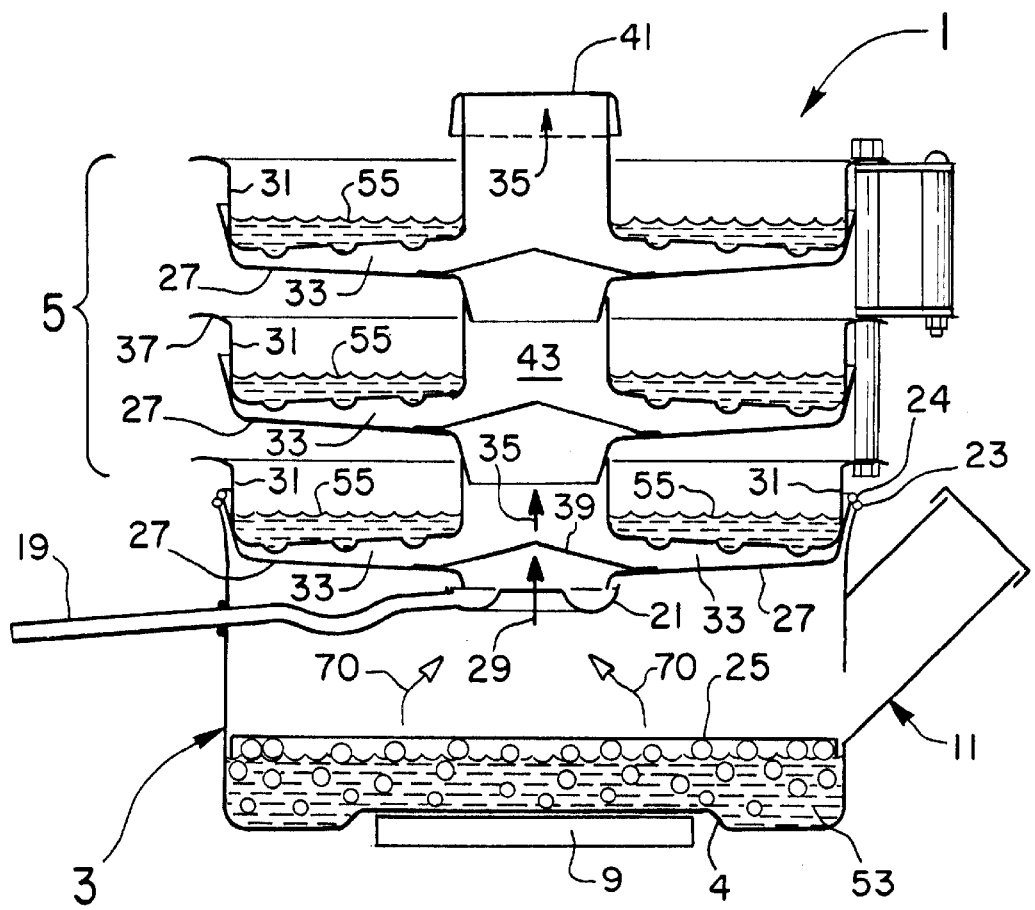
FIG. 3 is a cross-sectional view of the assembled distilling apparatus of FIG. 1.

The cooling tray assembly 5 (see FIGS. 2 and 3) preferably has three levels of distillate collection trays 27 with the bottom tray 27 placed over and resting on the upper rim 23 of the boiler 3 as shown in FIG. 3. Specifically, the outer rim 24 of bottom tray 27 rests on the upper rim 23 of the boiler 3. This is preferably a loose fit so that the cooling tray assembly 5 can readily be lifted off of the boiler 3. In this regard, a sealing water film (i.e., condensing steam) forms between the boiler 3 and the bottom tray 27 adjacent the rims 23 and 24 to seal the boiler 3 from the surrounding atmosphere.

Referring again to FIGS. 2 and 3, each collection tray 27 has a first opening 29 formed in the center to allow the steam to pass therethrough (i.e., from the boiler 3 through the bottom tray 27 and subsequently through the upper, two trays 27 of the cooling tray assembly 5, as explained in more detail below). A coolant water reservoir 31 as shown is placed over and respectively fitted (e.g., press fit) into each collection tray 27 to form a condensing area 33 (FIG. 3) between each collection tray 27 and the coolant water reservoir 31. Each coolant water reservoir 31 has a centrally located, second opening 35 so that when assembled, the first openings 29 and the second openings 35 collectively form a steam passageway 43 through the center of the entire cooling tray assembly 5. An inverted, substantially V-shaped deflector 39 is placed on each collection tray 27 in the steam passageway 43 over each first opening 29 and beneath each second opening 35. A vent cover 41, as explained in more detail below, is placed at the top of the cooling tray assembly 5 covering and fitted (e.g., by a press fit) over the opening 35 of the uppermost coolant water reservoir 31.

As mentioned above, the cooling tray assembly 5 preferably has three collection trays 27 and three mating reservoirs 31, thus forming three condensing areas 33 and a single steam passageway 43 that leads from the boiler 3 into and out of each condensing area 33. However, it is understood that any number of trays 27 and reservoirs 31 can be used under the teachings of the present invention. The precise number of trays 27 and reservoirs 31 and their dimensions will depend upon a number of factors such as desired efficiency, production volume, and rate of production. In addition, the trays 27 and reservoirs 31 can be joined together in any suitable manner such as by a press fit, thread-fit, permanent weld, or even formed as a single unit. In the preferred embodiment, both the tray 27 and the reservoir 31 of each fitted pair are shaped as opposing cones. This not only facilitates the initial driving out of the air from the distilling apparatus 1 but also facilitates the flow of steam and distillate in the condensing area 33 between each such pair. In addition, the outer perimeters of at least the two, upper coolant water reservoirs 31 preferably have turbulence rims 37 formed thereon, for reasons explained in more detail below.

As best seen in FIGS. 1 and 2, the cooling tray assembly 5 is held together by a plurality of rods 45 evenly spaced about the circumference of the cooling tray assembly 5 (e.g., every 90° or 120°). Each rod 45 is placed through the aligned turbulence rims 37 of each coolant water reservoir 31 (i.e., in the direction of assembly line 46 in FIG. 2) and fastened, for example, using a hex nut 47 threaded onto the rod 45. A spacer 49 and a handle 51 can be attached through the rod 45 so that the cooling tray assembly 5 can also be removed from the boiler 3 and handled as a single unit. With this arrangement, the cooling tray assembly 5 can be easily disassembled for cleaning and storage.

It is to be expressly understood that the cooling tray assembly 5 can be held together using any suitable means and is not limited to the rods 45 discussed above. In another embodiment, separate connectors need not be provided at all and the cooling tray assembly 5 could be formed as a single unit or the individual components could be threadably engaged to one another. Alternatively, the cooling tray assembly 5 need not be held together as a single unit and could be a series of trays 27 and reservoirs 31 stacked on top of one another.

It is also understood that additional support for the collection cup 21 could be provided (e.g., one or more braces extending from the collection cup 21 to the upper rim 23 of the boiler 3). Also, in the preferred embodiment and to reduce heat loss, the diameter of the boiler 3 is on the order of 11.5 inches and has a slightly concave area 4 (approximately eight to nine inches in diameter) formed in the bottom center of the boiler 3 as shown in FIG. 2. As such, the boiler 3 completely covers the burner 9 (see FIG. 3) so that heat from the burner 9 is not lost around the sides of the boiler 3 and into the surrounding atmosphere. The bottom of the boiler 3 is also preferably black to aid in heat absorption.

In the assembled, cross-sectional view of FIG. 3, the boiler 3 has been filled with raw water 53 through the spout 11 and the trays 27 have been filled with coolant water 55. Such coolant water 55 can be poured directly into each coolant water reservoir 31 with the top reservoir 31 being filled from above and the middle and bottom reservoirs 31 being filled from the open sides thereof. As explained in more detail below, the coolant water 55 can be of any quality as it evaporates and does not come into contact with the purified water.

2. The Screen

Figure 4:
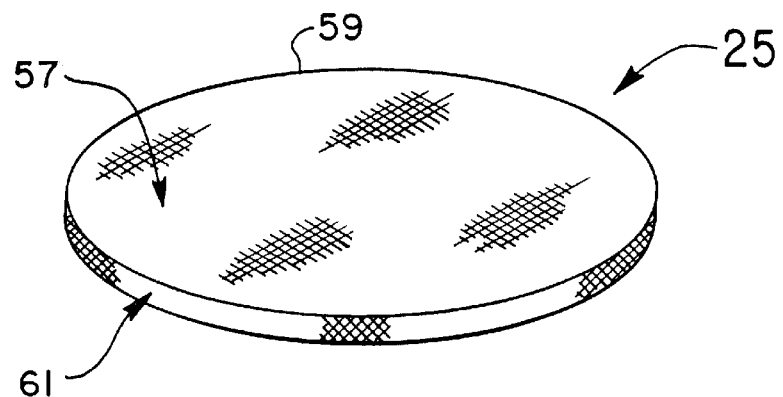
FIG. 4 is a perspective view of the screen of the distilling apparatus.

FIG. 4 is a perspective view of the self-regulating screen 25 of the present invention. The screen 25 is preferably made from conventionally available household window screen, although any suitable mesh material can be used. The screen 25 is the same shape as the interior cross-section of the boiler 3 and is dimensioned to cover substantially all of the exposed raw water 53 in the boiler 3. For example, where the boiler 3 is cylindrical (i.e., having a circular cross-section), the screen 25 has a substantially flat, circular central portion 57 (see FIG. 4) with a radius slightly smaller than that of the interior cross-section of the boiler 3. In this manner, particulates from bursting steam bubbles formed from the raw water 53 cannot pass by or around the screen 25 and become entrained in the steam, which would result in contaminating the distillate. The screen 25 has a substantially cylindrical, sidewall portion 61 extending downwardly from the central portion 57 and extending substantially about the perimeter 59 of the central portion 57. Preferably, the screen 25 is formed as a single unit with the central portion 57 and the sidewall portion 61 simply designating portions of a one-piece screen 25. However, in other embodiments, the central portion 57 and the sidewall portion 61 could be formed separately and attached to one another.

Figure 5A:
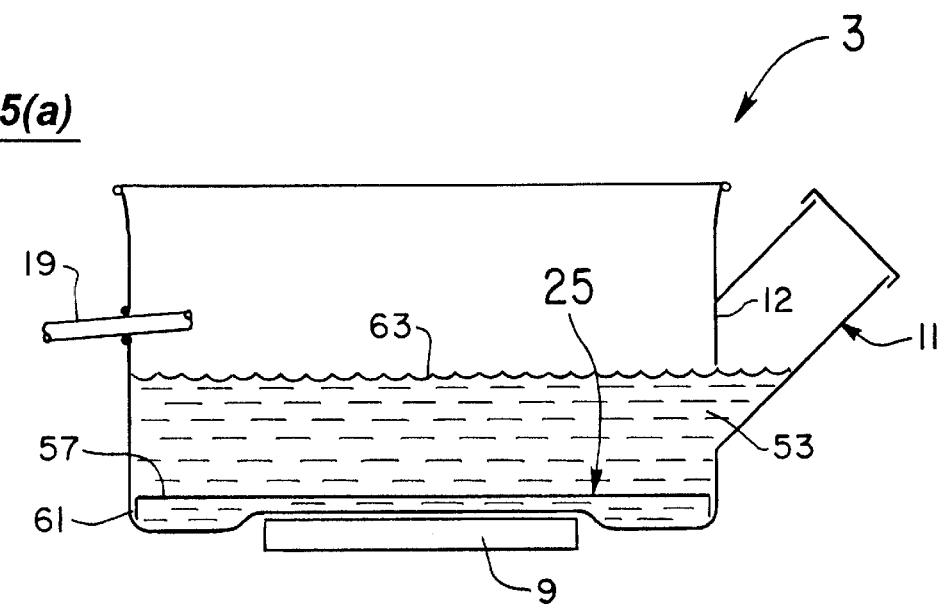
FIG. 5(a) is a cross-sectional view of the boiler of the distilling apparatus of FIG. 1 showing the screen resting beneath the surface of the raw water.
Figure 5B:
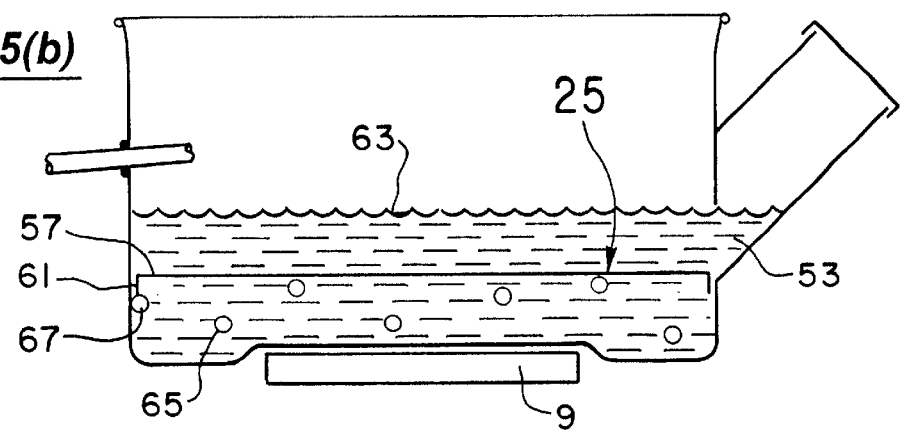
FIG. 5(b) illustrates the screen of FIG. 5(a) rising as the raw water begins to boil.
Figure 5C:
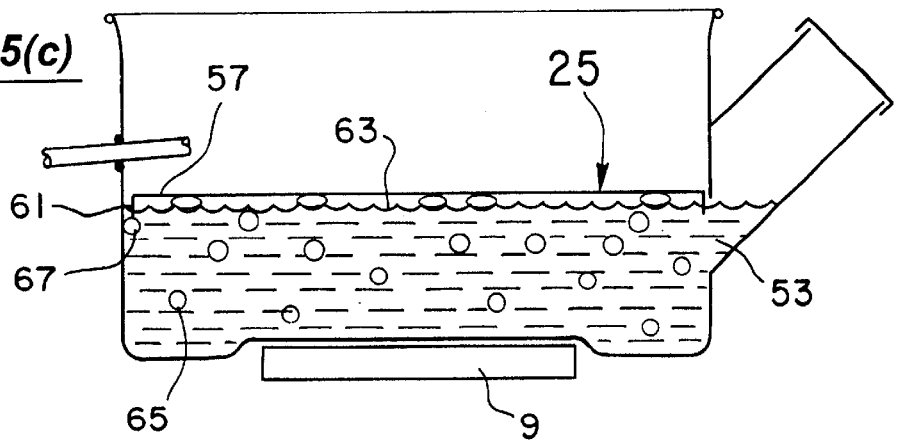
FIG. 5(c) shows the screen of FIG. 5(a) floating above the surface of the raw water at a low boil.

The screen 25 is self-regulating, as best described with respect to FIGS. 5(a)–(d). In FIG. 5(a), the screen 25 is shown resting beneath the surface 63 of the raw water 53 in the boiler 3. When placed on the burner 9 (e.g., at 2500 watts), the raw water 53 (e.g., about one gallon) starts to boil (e.g., in about twelve minutes) as shown in FIG. 5(b). The rising bubbles 65, 67 are trapped beneath the central portion 57 and sidewall portion 61 of the screen 25, thus gradually raising the screen 25 toward the surface 63 of the raw water 53 as shown in FIG. 5(b). This continues until the screen 25 actually floats above the surface 63 of the raw water 53 as shown in FIG. 5(c).

Figure 5D:
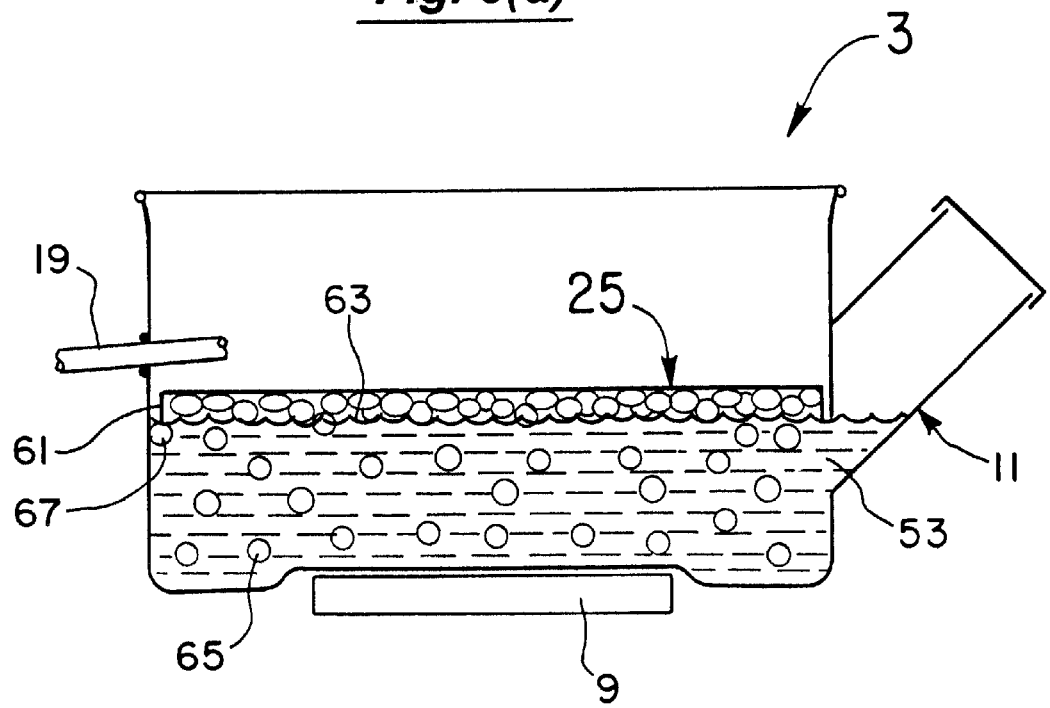
FIG. 5(d) shows the screen of FIG. 5(a) floating higher above the surface of the raw water at a high boil.

The screen 25 in this regard will self-adjust its height above the surface 63 of the raw water 53. That is, if a low heat as in FIG. 5(c) is applied by the burner 9 to the boiler 3 so that the water 53 is at a relatively low rate of boil, the screen 25 will only be lifted partially above the surface 63. Where a high heat as in FIG. 5(d) is applied to the boiler 3 and hence the raw water 53 made to boil more rapidly, the screen 25 will be lifted higher above the surface 63. For example, the central portion 57 of the screen 25 may rise from the bottom of the boiler 3 to a height of about 0.1 to 0.7 inches above the surface 63 of the raw water 53, depending on the heat applied from the burner 9. The higher the screen 25 is above the surface 63, the higher the pressure is from the raw steam 68 (see the enlarged view of FIG. 5(e)) underneath the screen 25, and thus the temperature is also higher by one or two degrees. This temperature difference between the raw steam 68 under the screen 25 and the water film 69 of FIG. 5(e) formed on the screen 25 helps to evaporate water off of the top side 73 of the screen 25 which in turn helps to condense the steam 68 faster on the bottom side 71 of the screen 25. In addition, the rising screen 25 also exposes more surface area of the screen 25 for vaporization since more of the sidewall 61 is exposed above the surface 63 of the raw water 53 (compare FIGS. 5(c) and 5(d)). Both of these effects increase the energy transfer capacity of the screen 25 and as explained in more detail below, they also cause more clean, "second-generation" steam 70 in FIG. 5(e) to be produced from the water film 69 formed on the screen 25. Such increased production of steam 70 then leads to increased production of distillate or purified water in the distilling apparatus 1.

The "skins" or outer surfaces of the bubbles 65, 67 in FIG. 5(d) are made of raw water 53. Without the screen 25, the bubbles 65, 67 would burst at the surface 63 of the boiling water 53, causing small particles from the raw water 53 to become entrained in the rising steam. Such raw water particles can contaminate the steam with up to 2% or more of raw water 53. With the screen 25 in place, as the bubbles 65, 67 of FIG. 5(d) rise to the surface 63 of the raw water 53, the skins of the bubbles 65, 67 continuously smear onto the screen 25 so that a thin water film 69 (see the enlarged view of FIG. 5(e)) forms on the screen 25. As an illustration, when a light is shined onto the floating screen 25 in an open boiler 3, it looks like a solid sheet of glass (i.e., with no open holes). That is, the screen 25 becomes impervious to the raw steam 68 formed beneath the water film 69 in FIG. 5(e), which raw steam 68 then condenses on the underside 71 of the water film 69. The latent heat from the raw steam 68 is passed into the water film 69 on the screen 25 causing a new or "second-generation", clean steam 70 to rise from the top side 73 of the water film 69 on the screen 25. This clean steam 70 is free of any particles of contaminated raw water 53, eliminating the need for any additional filtering (e.g., using carbon filters) to further purify the distillate generated by the distilling apparatus 1 of the present invention.

The water film 69 constantly thickens with the addition of bubble skins and with the condensing steam 68 on the underside 71 of water film 69. Simultaneously, the water film 69 thins as water vaporizes off of the top side 73 of the water film 69 to form clean steam 70. As an illustration, when a knife is quickly and closely waved over the top surface of boiling water that is not covered by a screen 25, the knife accumulates droplets of contaminated water in addition to a steam film. But when the same knife is waved above the screen 25 of the present invention, no particles of contaminated raw water appear on the knife, only a film of the clean steam 70. It is also noted at this time that the screen 25 is self-cleaning in that the agitating action of the bubbles 65, 67 that are trapped beneath the screen 25 keep the screen 25 scrubbed free of mineral deposits from the raw water 53.

3. Steam Flow Path

Figure 5E:
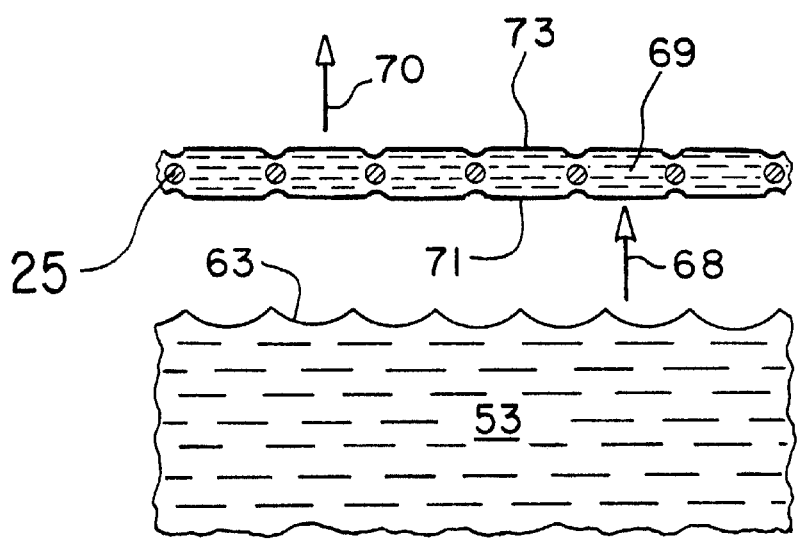
FIG. 5(e) is an enlarged, cross-sectional view of the screen of FIG. 5(d) showing the water film formed on it.
Figure 6:
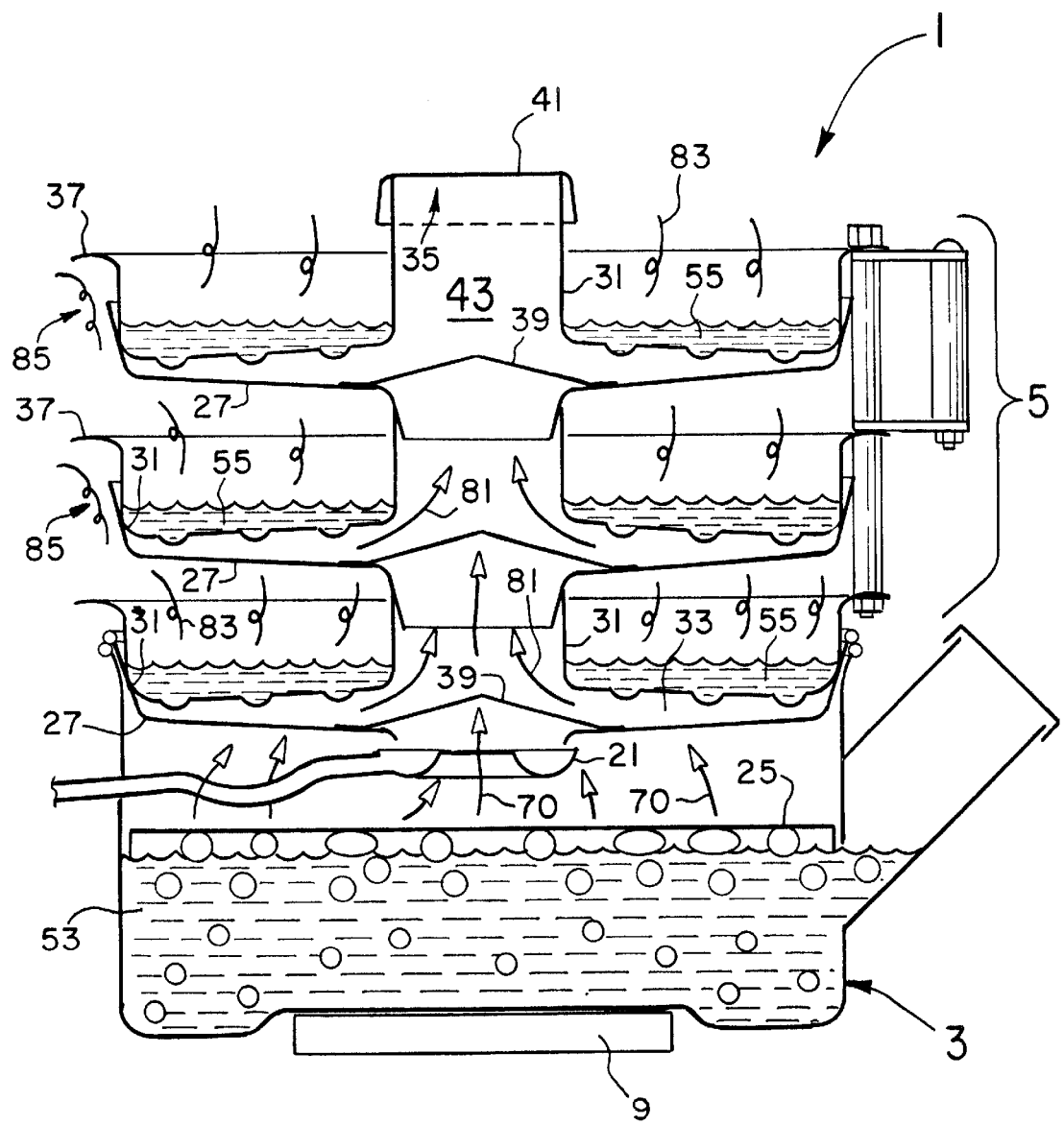
FIG. 6 is a cross-sectional view of the distilling apparatus of FIG. 1 illustrating the flow path of the steam and evaporated coolant.

The flow path of the steam 70 from the screen 25 in the boiler 3 into the cooling tray assembly 5 is shown in FIGS. 3 and 6. As explained in more detail below and after the screen 25 is floating and fully wetted (i.e., water film 69 of FIG. 5(e) is formed thereon), the clean steam 70 formed on the top side 73 of the water film 69 in FIG. 5(e) rises and travels first along path 29 in FIG. 3 through the center of the donut-shaped distillate collection cup 21. The clean steam 70 then travels past the deflector 39 into the first condensing area 33 and back up along path 35. This convoluted path of 29, 33, and 35 is repeated at each tray 27 level with the multi-level paths 29 and 35 collectively forming a steam passageway 43 through the center of the entire cooing tray assembly 5.

Figure 6A:
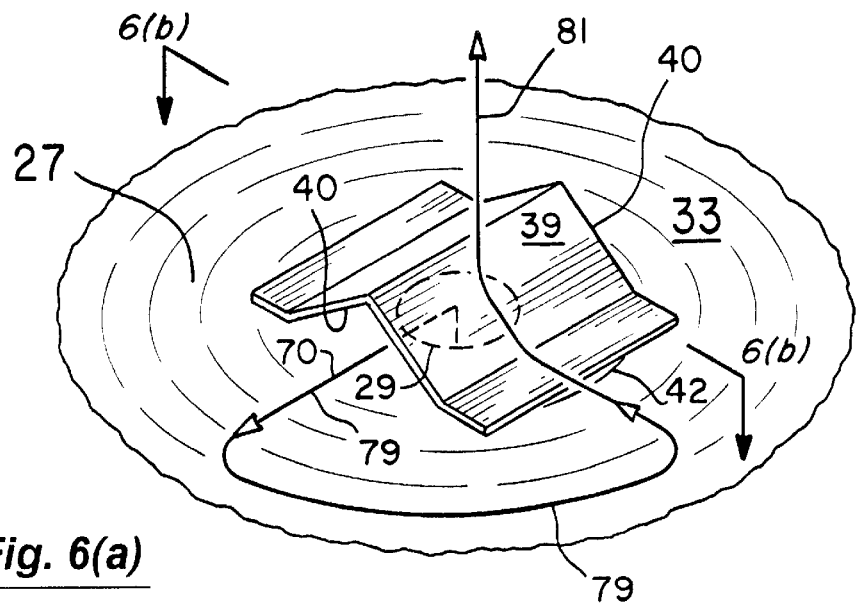
FIG. 6(a) is a perspective view of the deflector of the present invention showing the path of a portion of the steam in FIG. 6 about the deflector.

More specifically, the steam 70 from the path 29 in FIG. 3 is directed or guided by the deflector 39 into the first condensing area 33. This involves a very convoluted path which is perhaps best seen by reference to FIGS. 6(a)–6(c). As shown, the steam 70 passing up through the first path opening 29 in the bottom tray 27 in FIG. 3 is directed underneath and out of each of the two open ends 40 of the deflector 39 (see FIG. 6(a)). For clarity, this is illustrated in FIG. 6(a) at only one open end 40 and for only one quadrant of the flow of steam 70. As shown in this FIG. 6(a), the one quadrant of the steam 70 from the opening 29 is directed outwardly through the nearer open end 40 and into the condensing area 33 in the direction of arrows 79. Excess steam 70 then leaves the condensing area 33 in the direction of arrow 81. The inverted, substantially V-shaped deflector 39 in this regard causes the entering steam 70 and the exiting steam 81 to flow perpendicular to each other. This in turn causes the steam 70 to "sweep" about the condensing area as.

Figure 6B:
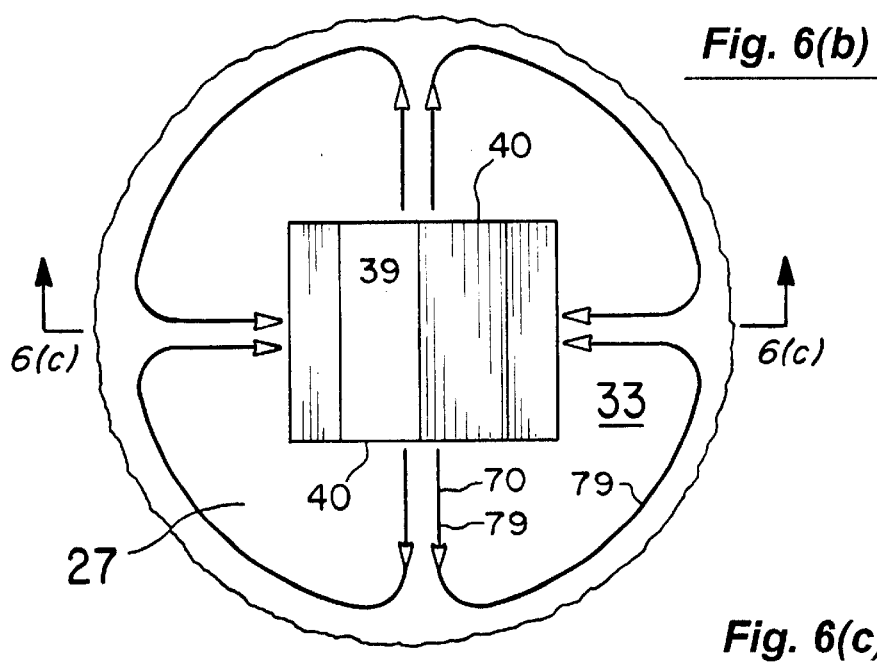
FIG. 6(b) is a top view of the deflector of FIG. 6(a) showing the full path of the steam about the deflector.
Figure 6C:
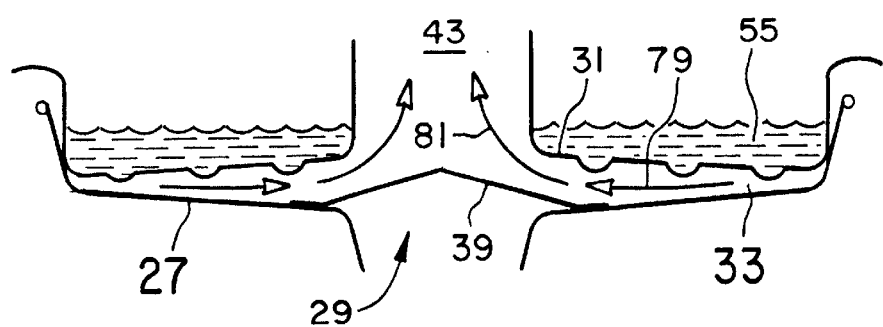
FIG. 6(c) is a cross-sectional view of the deflector of FIG. 6(a) further illustrating the path of the steam.

At the initial startup of the distilling apparatus 1, this sweeping action in all four quadrants (see FIG. 6(b)) will serve to drive all of the air and volatiles (e.g., volatile organic carbons, which may have been released while the raw water 53 in the boiler 3 was initially heating up) out of the condensing area 33 in the upward direction of arrow 81 in FIG. 6(a). FIG. 6(b) in this regard shows all of the quadrants of the flow of steam 70 through the condensing area 33. As indicated above, this sweeping action, coupled with the slightly upwardly sloped (e.g., 2 degrees) bottom of the water coolant reservoir 31 in FIG. 6(c), causes the air and any volatiles initially evaporated from the raw water 53 to be pushed up through the steam passageway 43 (i.e., in the direction of arrow 81 in FIG. 6(a)) into the next higher tray 27.

This process is then repeated for each level until all of the air and volatiles have been forced out through the vent cover 41 in FIG. 6 as explained in more detail below In this manner, air pockets that would otherwise reduce the surface area on which the steam 70 could condense (i.e., on the bottom surface of the reservoirs 31) are reduced or eliminated. Once in a condensing area 33, the steam 70 begins to condense on the underside of the coolant water reservoir 31 as explained in more detail below. However, it is noted at this time that because the coolant water reservoir 31 is initially filled with cold coolant water 55, all of the steam 70 initially being produced by the boiler 3 tends to condense in the bottom condensing area 33 of FIG. 6. Thereafter, the coolant water 55 heats up (e.g., to about 193° F.) and the steam 70 does not condense in the bottom tray 27 as fast as it is being produced in the boiler 3. Consequently, the steam 70 then begins to vigorously move upward at 81 as shown in FIG. 6 and also FIGS. 6(a) and 6(c) to the upper two trays 27.

In the preferred embodiment which has three condensing areas 33, the coolant 55 in all three reservoirs 31 during normal operation is hot (e.g., 193° F. in the lower two reservoirs 31 and 185° F. in the upper reservoir 31, which is fully open to the surrounding atmosphere). As explained above, the coolant 55 is initially cold and readily condenses the steam 70. However, after the coolant 55 heats up and there is no more cold coolant 55 to readily condense the steam 70, the coolant 55 transfers heat through evaporation 83 (see FIG. 6) of the coolant 55 to the surrounding atmosphere. That is, the coolant 55 sets up micro-convection patterns to convey the heat from the bottom of the reservoir 31 to the upper surface of the coolant 55, so that the heat can be removed by evaporation 83. It is believed that about 80% of this heat transfer through the coolant 55 occurs by micro-convection since water itself is a poor conductor of heat. That is, the hot molecules of coolant 55 at the bottom of the reservoir 31 are lighter than the rest of the coolant 55 so these molecules quickly move to the top of the coolant 55. As the hot molecules of coolant water evaporate at 83, some of the remaining molecules of coolant 55 are cooled by the energy removal which occurred when one molecule of coolant 55 is evaporated at 83. The cool molecules sink to the bottom of the reservoir 31, and the cycle repeats itself. For each drop of coolant 55 that evaporates at 83, enough energy is removed from the coolant 55 to preferably form one drop of distillate 105 (FIG. 8) on the underside of the reservoir 31 (i.e., a one-to-one ratio of coolant evaporation to distillate production).

The evaporated coolant 83 in FIG. 6 must quickly move away from the reservoir 31 into the surrounding atmosphere so that the coolant 55 can continuously evaporate to allow the remaining coolant 55 to continue to absorb more heat from the steam 70 so that the steam 70 will condense to form distillate. As best illustrated on the left side of FIG. 6, the movement of the evaporate at 85 outwardly away from each of the lower two reservoirs 31 is aided by the slope (e.g., 2 degrees) of the distillate tray 27 thereabove and by the curved and outwardly extending turbulence rim 37 on the outer edge or perimeter of each of the reservoirs 31. If the turbulence rims 37 were not present, the evaporate 83 from each of the lower reservoirs 31 would rise directly up along the sides of the next higher reservoir 31 and may even be driven by the cooler ambient air into the area above the coolant 55 in the next higher reservoir 31. This not only would disrupt the flow of evaporate 83 away from the coolant 55 in the next higher reservoir 31 but also would raise the humidity of the area above the coolant 55 in the next higher reservoir 31. This in turn can greatly reduce the efficiency (e.g., by 20%) of the cooling operation of the reservoirs 31.

As the coolant 55 evaporates at 83, the depth of the coolant 55 decreases and the performance or efficiency of the distilling apparatus 1 actually increases. That is, the coolant water reservoirs 31 are preferably designed to hold a relatively thin layer of coolant 55 to aid in microconvection (e.g., initially holding 0.25 inches of coolant 55 near its center and about 0.65 inches at its outer diameter). Also, in the preferred embodiment, the upper reservoir 31 is completely open at its top to the surrounding atmosphere as shown in FIG. 6 and the lower two reservoirs 31 are open on their sides to the surrounding atmosphere. In this regard, there are preferably about two inches between each of the two lower reservoirs 31 and the tray 27 immediately thereabove. This spacing also allows the user to easily pour coolant 55 from the sides directly into each of the lower, two reservoirs 31 without having to disassemble the cooling tray assembly 5.

4. Distillate Collection

Figure 7:
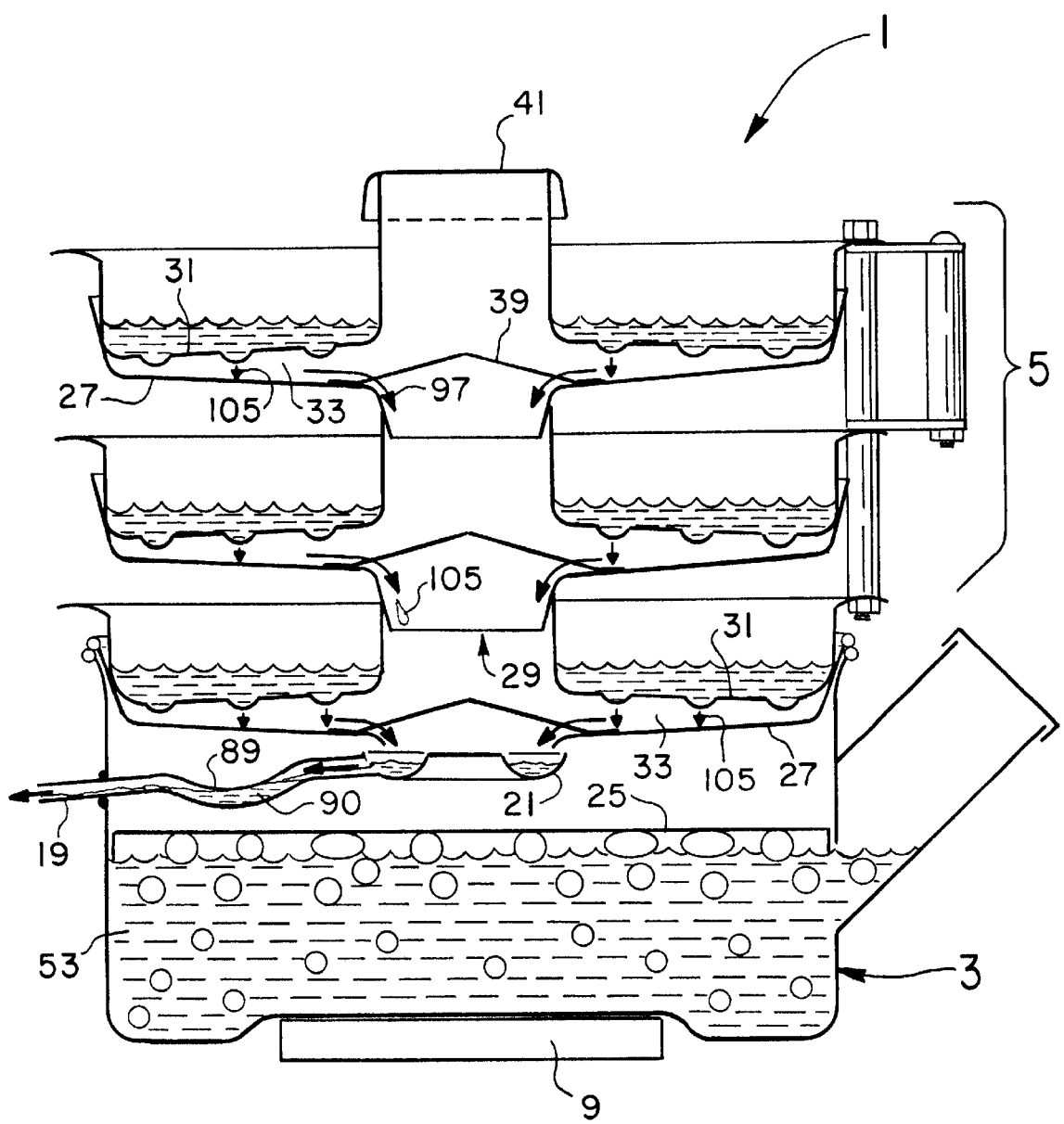
FIG. 7 is a cross-sectional view of the distilling apparatus of FIG. 1 showing the flow path of the distillate or purified water.
Figure 7A:
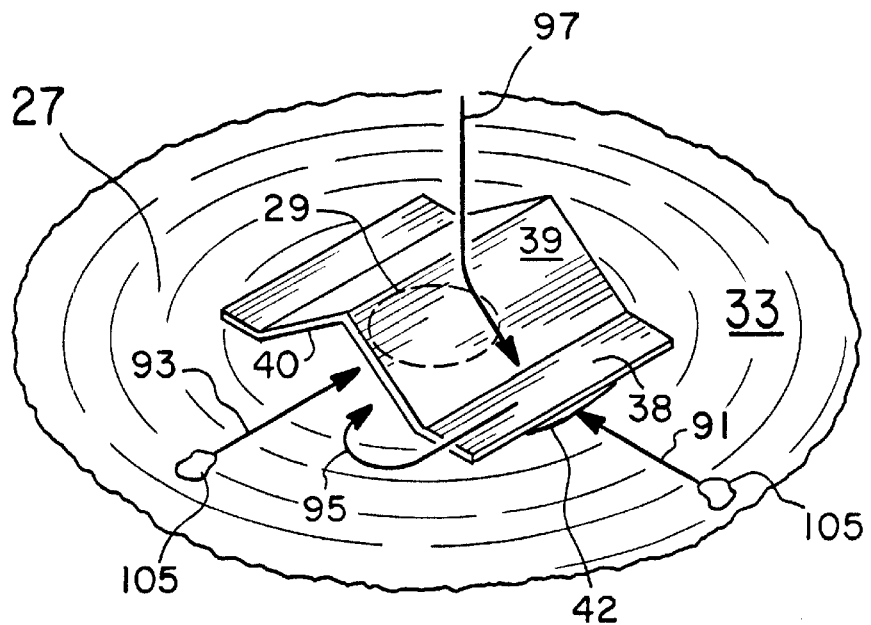
FIG. 7(a) is a perspective view of the deflector of the present invention showing the path of a portion of the distillate in FIG. 7 about the deflector.
Figure 7B:
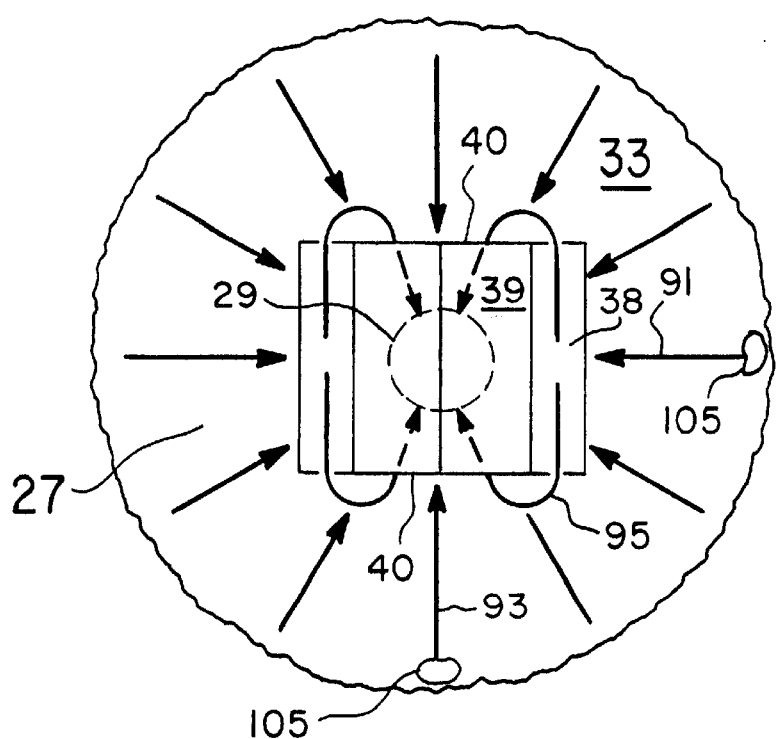
FIG. 7(b) is a top view of the deflector of FIG. 7(a) showing the full path of the distillate about the deflector.

The flow path of the distillate or purified water 105 generated or formed from the condensing steam 70 is shown in FIG. 7. After condensing on the bottom of each coolant water reservoir 31 in each condensing area 33, the distillate 105 begins to drip onto the tray 27 immediately therebelow and then flow downwardly to the collection cup 21. This is shown in more detail in FIGS. 7(a)–(b) in which the drops of distillate 105 flow (e.g., in the direction of arrows 91 and 93) along the sloped collection tray 27 toward the opening 29 at the center of the respective tray 27. The distillate 105 flowing in the direction of arrow 91 initially flows into gap 42 formed between the ridge 38 of deflector 39 and the sloped, conical surface of the collection tray 27. In the preferred embodiment, the gap 42 is so small that the distillate 105 quickly forms a water seal within the gap 42 and the liquid distillate 105 passes over the gap 42 onto ridge 38 and continues to flow along the ridge 38 around to the open end 40 in the deflector 39 (i.e., in the direction of arrow 95) and down through the opening 29. This flow occurs at each tray level and drips between each tray level in the direction of arrow 97 in FIG. 7(a) down to the bottom tray 27 and from there into the distillate collection cup 21.

The formation of the distillate 105 is shown in more detail in FIGS. 8 and 8(a). More specifically, the lower surface 101 (see FIG. 8(a)) of reservoir 31 is preferably made wettable (e.g., by sandblasting or otherwise roughing the surface) so that the steam readily condenses on the lower surface 101 and forms a thin, distillate film 103. As more steam condenses, the film 103 becomes thicker and heavier, especially on the bottoms of the dimples 99'–99'" (see FIG. 8). A progression for forming a drop 105 can be seen in FIG. 8 where the film 103 is initially very thin on the bottom of each dimple (e.g., dimple 99'). Gradually, as more steam condenses, the film 103 grows thicker, especially on the bottoms of the dimples (e.g., see dimple 99"). Ultimately, the film 103 on the bottoms of the dimples (e.g., dimple 99'") becomes so big and heavy that it drips off (e.g., see drop 105 from dimple 99'"). The drop 105 pulls some of the film 103 off of the lower surface 101 about the dimple 99'" so that immediately after dripping, the surface 101 around the dimple 99'" has little if any film 103 thereon. The film 103 almost immediately begins to thicken again on the bottom of the dimple 99'" (e.g., in the directions of arrows 107) and the process repeats itself.

It is to be understood that the above example has been shown and described for purposes of illustration only, and that this progressive process of drop formation is occurring on each dimple 99'–99'" individually. By facilitating drop formation, the dimples 99'–99'" cause the water film 103 to stay very thin on the bottom 101 of the coolant water reservoir 31, thus causing the heat to transfer from the steam to the coolant water 55 at a rapid rate and increasing the efficiency by approximately 20%. In addition to facilitating drop formation, the dimples 99'–99'" also increase the surface area for heat transfer to occur because more surface area of the coolant reservoir 31 is exposed to the steam in the condensing area 33.

Each drop 105 of distillate in FIG. 8 falls onto the upper surface 110 of the collection tray 27 forming a collection film 109 thereon. The collection film 109 then flows toward the opening 29 in the center of tray 27, as discussed with respect to FIGS. 7(a)–(b), and down to the collection cup 21.

The collection cup 21 is shown in more detail in FIG. 8(b). The cup 21 preferably has a large diameter opening 21' (e.g., 1.25 inches) formed in its center so that the steam 70 can readily move upward from the screen 25 in the boiler 3 into the cooling tray assembly 5 without having to go around and over the top of the cup 21. As such, less clearance is required between the cup 21 and the bottom tray 27 of the cooling tray assembly 5. This allows the distilling apparatus 1 to be compact (e.g., for storage and use on a conventional household range). Without the central cup opening 21', the low clearance between the cup 21 and the bottom tray 27 could cause pressure to undesirably build up within the boiler 3 and the excess steam would have to be vented and lost to the surrounding atmosphere.

The transfer pipe 19 as also shown in FIG. 8 preferably includes a water trap 89 to prevents the loss of steam 70 through the transfer pipe 19. In addition, the water trap 89 serves as a safety relief valve. That is, when the pressure in the boiler 3 gets above, for example, 0.375 water column inches (0.01 psi), the water 90 in the water trap 89 is pushed out allowing the steam 70 to exit into the water collection vessel 7. Similarly, the trap 89 can serve as a vacuum relief, allowing air from the surrounding atmosphere to flow into the boiler 3, such as when cold water is added to the coolant reservoirs 31. Preferably, the trap 89 is sufficiently deep to insure that it does not blow out prematurely (i.e., before the vent cover 41 becomes operational). In other words, the vent cover 41 as explained below is preferably the primary pressure and vacuum release, and the water trap 89 is a secondary pressure and vacuum relief.

5. Steam Release

Figure 9:
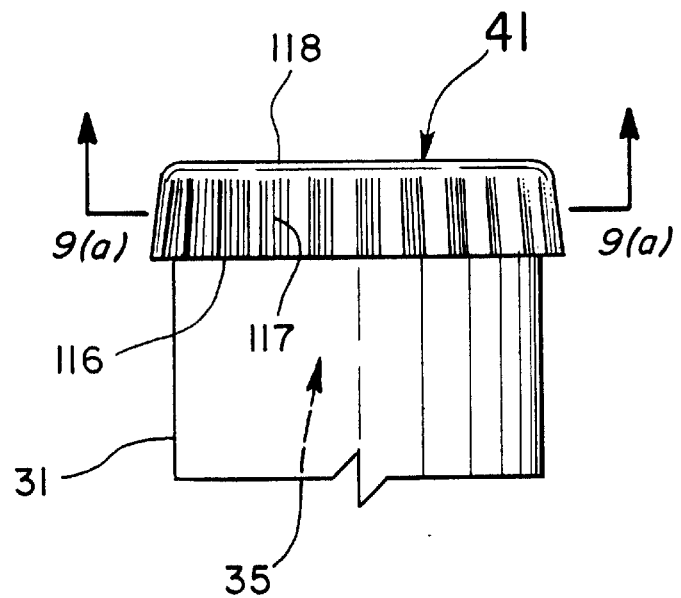
FIG. 9 is a side view of the vent cover of the present invention.

A pressure release or steam vent is provided in the opening 35 in the top most reservoir 31 as shown in FIGS. 6 and 9. The opening 35 as best seen in FIG. 9 is capped by a cover 41. The cover 41 is similar to a conventional soda bottle cap with vertical ridges 117 formed therein but with two important distinctions. First, the cover 41 of the present invention is preferably press fitted over the opening 35 of the uppermost reservoir 31 of the cooling tray assembly 5. Second, the ridges 117 extend substantially vertically the entire distance between the lower edge 116 and the top rim 118 about the perimeter of the cover 41.

Figure 9A:
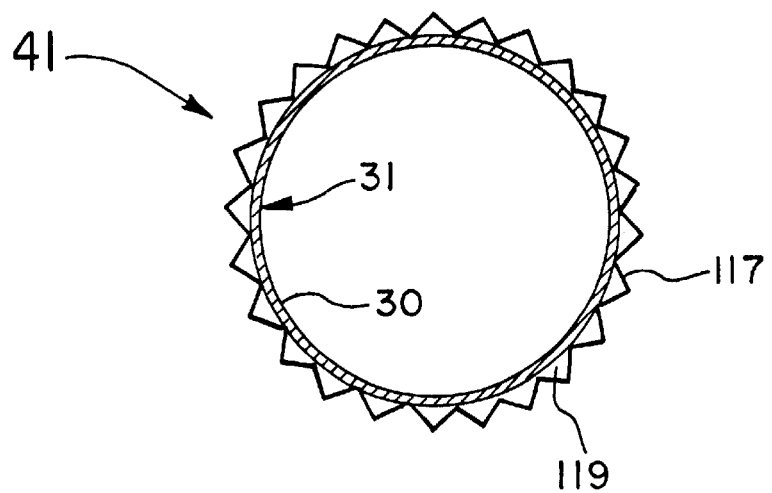
FIG. 9(a) is a view of the vent cover taken along line 9(a)—9(a) of FIG. 9.

In this manner and when the distilling apparatus 1 is first started, the vent cover 41 functions to release the air and any volatiles that were swept out through the condensing areas 33 by the initial steam 70, as explained above with respect to FIG. 6. The air and volatiles make their way up through the opening 35 of FIG. 9 and then out through the ridges 117 formed between the cover 41 and the reservoir 31. The steam flows and begins to pass through the ridges 117 of the cover 41. However, the cover 41 then cools and condenses the steam within the ridges 117 causing a water seal to form between the ridges 117 and the neck of the reservoir 31 at 119 in FIG. 9(a).

Under normal operating conditions, the steam pressure is insufficient to force the steam downward through the ridges 117. However, when the pressure exceeds that of normal operating conditions, the water seal at 119 readily breaks, allowing the excess pressure of steam to vent through the ridges 117 to the surrounding atmosphere. The cover 41 is also designed to relieve a vacuum should one be formed within the distillating apparatus 1 (e.g., by cool water being added to the coolant reservoirs 31 during operation). Such a vacuum could cause a surge wave in the boiler 3, throwing raw water 53 into the collection cup 21, thus contaminating the distillate 105. However, the water seal at 119 readily breaks under such a vacuum allowing air from the surrounding atmosphere to flow into the distillating apparatus 1. As such, the cover 41 of the present invention functions both as a pressure relief and a vacuum relief.

It is understood that the cover 41 described above is a preferred embodiment and that other covers are contemplated under the teachings of the present invention. Furthermore, the vent and cover 41 are preferably centrally placed at the top of the distillating apparatus 1 so that the cover 41 remains cool. That is, the vent and cover 41 are placed sufficiently far away from the boiler 3 and the burner 9 and out of the direct path of any heat rising thereform about the sides of the boiler 3 and cooling tray assembly 5. As such, the water seal 119 readily forms and is not evaporated by the surrounding heat.

6. Distillate Collection Vessel

Figure 10:
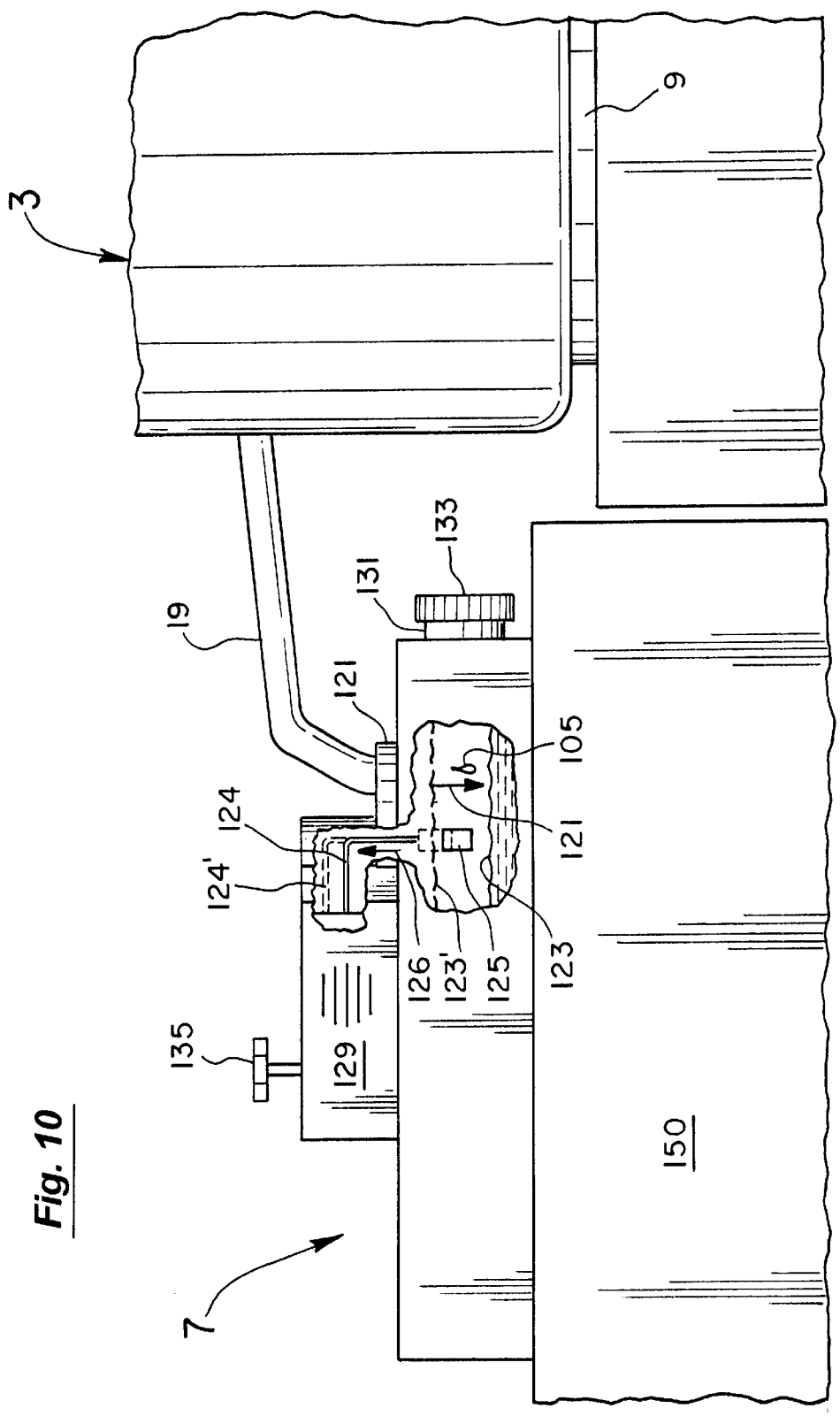
FIG. 10 is a side view of the collection vessel of the present invention.

The distillate collection vessel 7 is shown in more detail in FIG. 10. In this regard, distillate 105 (FIG. 7) flows from the collection cup 21 through the transfer pipe 19 and a first vessel opening 121 formed in the vessel 7. A second vessel opening 131 ultimately to be used to pour out the collected distillate is formed in the vessel 7 and can be closed and sealed with lid 133. A separate lid could also be provided for the opening 121 if desired.

The collection vessel 7 also serves to remove any volatiles that may be entrained in the distillate (i.e., that may have initially condensed on the bottoms of the cool reservoirs 31 before being vented to the surrounding atmosphere through vent 41). In this regard, the distillate entering the vessel 7 is preferably still very hot (e.g., 160°–190° F. or higher). Any volatiles entrained in the distillate are thus evaporated and exit the vessel 7 through the opening 121 into the surrounding atmosphere, further purifying the collected distillate.

The distillate collection vessel 7 is preferably made of stainless steel. As such, the vessel 7 is durable and maintains the purity of the distillate 105, in addition to condensing any vapors that form within the vessel 7 and helping to cool the collected distillate 105. However, any suitable material can be used under the teachings of the present invention. Also, in the preferred embodiment, the vessel 7 has a low profile (e.g., 1.5 inches high) so that it can sit flat and in a stable position on the kitchen counter 150. The low profile vessel 7 also ensures that the transfer pipe 19 has a downward slope to the collection vessel 7 even when the burner 9 of the stovetop is lower than the countertop 150, as shown in FIG. 10. The vessel 7 is compact and provides a large flat area to support the fill alarm 129 thereon. It is understood that vessel openings 121, 131 need not be separate, and a single opening could be provided under the teachings of the present invention.

The distilling apparatus 1 of the present invention preferably includes a fill alarm 129 (FIG. 10) to signal to the user when the collection vessel 7 has reached a predetermined level 123' (i.e., full, one liter, or any other desired fill level). In a preferred embodiment, a wind-up (i.e., at 135) fill alarm 129 such as a music box is placed adjacent the vessel opening 121 and activated when a float 125 is contacted by and rises with the collected distillate level 123. That is, the float 125 rises with the water level 123 to 123', raising the attached member at 124 to position 124' (i.e., similar to operating a conventional light switch). This in turn activates the alarm 129 to sound. Such an embodiment does not require electricity and does not affect the operation of the boiler 3 or the cooling tray assembly 5.

It is to be understood that the alarm 129 can be attached to the vessel 7 or can be a separate component that is placed on or adjacent the vessel 7. In addition, the alarm 129 need not be a mechanical, wind-up music box and can be, for example, an electronic alarm or timer. Alternatively, a boiler whistle could be activated when the water level in the boiler 3 reaches a predetermined level (i.e., nearly empty) that corresponds to the desired fill level 123' of the vessel 7, thus serving both to warn the user that the vessel 7 is full and the boiler 3 is nearly empty.

7. The Baffle

Figure 11A:
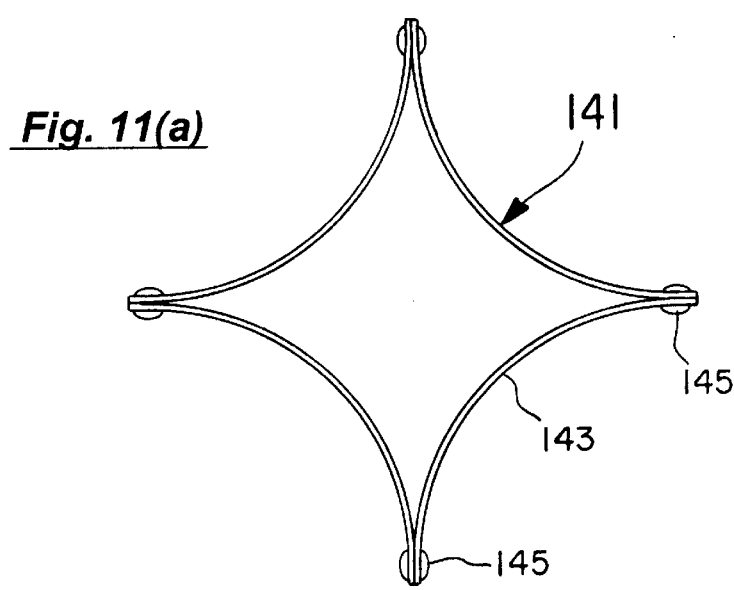
FIG. 11(a) is a top view of the baffle of the present invention.
Figure 11B:
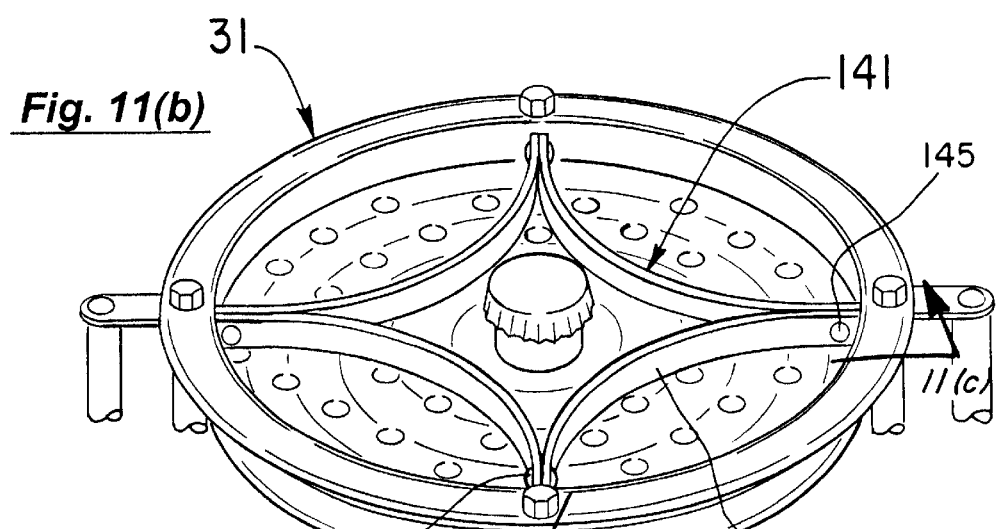
FIG. 11(b) is a perspective view of the baffle of FIG. 11(a) shown placed within a coolant water reservoir of the present invention.
Figure 11C:
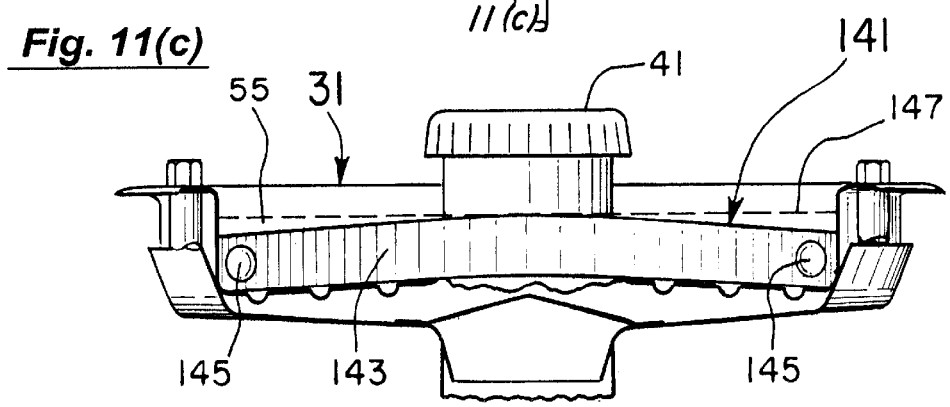
FIG. 11(c) is a cross-sectional view of the baffle taken along the line 11(c)—11(c) of FIG. 11(b).

A preferred embodiment of a baffle 141 of the present invention is shown in FIGS. 11(a)–(c). The baffle 141 has a plurality of members 143 pivotally attached to one another by fasteners 145 (e.g., rivet or screw). The members 143 can freely pivot about each fastener 145 so that the baffle 141 can conform to the surface on which it is placed. Specifically, as shown in FIG. 11(b), the pivoting members 143 allow the baffle 141 to be placed in the reservoir 31 and to conform to the slope of the floor of the reservoir 31. That is, the outer edges of members 143 (i.e., at pivot 145) fit down into and along the outer circumference of the reservoir 31, while the center portion of member 143 is pivotally raised about the center of the reservoir 31. This configuration is better seen in FIG. 11 (c) which is taken along line 11 (c)—11(c) in FIG. 11(b).

The baffle 141 serves both as a fill guide and to reduce waves in the coolant 55. The reservoir 31 in this regard is preferably filled with coolant 55 to the top of member 143 at 147 (see FIG. 11(c)). When the reservoir 31 is carried (e.g., from the sink to the burner 9), the baffle 141 reduces wave formation so that the coolant 55 does not splash out of the reservoir 31 and onto the user or the floor.

8. Sample Method of Household Operation

In household use, the distilling apparatus 1 of the present invention preferably takes about 65 minutes to fill a 3.0 liter collection vessel 7 when the heat supplied by the burner 9 is on the order of 2500 watts. In the preferred method of the present invention, the user pours approximately 4.4 liters (1.16 U.S. gallons) of raw water 53 into the boiler 3, using the fill line 12 in the spout 11 of FIGS. 2 and 5(a) as a guide. The user also adds about 1.1 liters (0.29 U.S. gallons) of raw water 53 into each of the three reservoirs 31, just covering the baffle 141 therein. With the transfer pipe 19 leading from the boiler 3 received in the collection vessel 7, heat is then applied to the boiler 3 from any suitable burner 9. The fill alarm 129 can thereafter be set to indicate to the user when the collection vessel 7 is full so that the user can shut off the burner 9 under the boiler 3. At the end of the cycle, there are preferably still approximately 1.4 liters of raw water 53 left in the boiler 3 and about 0.1 liters of coolant water 55 left in each of the three reservoirs 31. This is preferred to ensure that the minerals in the water left in the boiler 3 and reservoirs 31 remain in a soupy suspension and do not adhere to the boiler 3 and reservoirs 31 creating a clean problem.

While several embodiments of the present invention have been shown and described in detail, it is to be understood that various changes and modifications could be made without departing from the scope of the invention.

We claim:

1. A water-cooled distilling apparatus for forming purified water from raw water, said water-cooled distilling apparatus comprising:

a boiler for containing said raw water therein;

a self-regulating screen movable within said boiler, said raw water covering said screen when said raw water is cooler than the boiling temperature of water and said screen rising through said raw water to the surface of said raw water as said raw water begins to boil, said self-regulating screen including a central portion and a sidewall portion extending downwardly therefrom and substantially about the perimeter of said central portion, said sidewall portion extending from said central portion through the surface of and into said raw water when said raw water is boiling, said central portion of said self-regulating screen floating above said raw water at a height proportionate to the rate of boil, said central and sidewall portions of said self-regulating screen providing surface area for a water film to form thereon so that steam forms from and rises from said water film;

said self-regulating screen being dimensioned to cover substantially all of the exposed raw water so that any particles of said raw water are prevented from passing by said self-regulating screen and becoming entrained in and contaminating the steam rising from the screen; and a cooling tray assembly placed over said boiler and said self-regulating screen, said cooling tray assembly having at least one coolant water reservoir and at least one distillate collection tray so that steam rising from said self-regulating screen condenses on the bottom surface of said coolant water reservoir forming said purified water, said purified water dripping onto and being collected by said distillate collection tray.

2. The distilling apparatus of claim 1 wherein said central portion of said screen is substantially flat.

3. The distilling apparatus of claim 2 wherein said sidewall portion of said self-regulating screen is substantially cylindrical.

4. The distilling apparatus of claim 1 including means for increasing the rate of boil of the raw water and means for increasing the height of said central portion of said self-regulating screen above said raw water as the rate of boil increases to proportionately expose more surface area of the sidewall portion of said screen above the exposed raw water as the rate of boil increases.

5. The distilling apparatus of claim 1 wherein said central portion of said screen is substantially flat, said sidewall portion is substantially cylindrical, and the distilling apparatus includes means for increasing the rate of boil of the raw water and means for increasing the height of the sidewall portion above the raw water proportionate to the rate of boil wherein the height of the sidewall portion above said exposed raw water increases as the rate of boil increases to proportionately expose more surface area of the sidewall portion above the exposed raw water as the rate of boil increases.

6. The distilling apparatus of claim 1 including means operable to produce purified water substantially at a one-to-one ratio relative to evaporation from said water coolant reservoir.

7. The distilling apparatus of claim 1 further including a burner continuously operated at a minimum of about 2500 watts to provide heat to said boiler.

8. The distilling apparatus of claim 1 wherein said self-regulating screen includes means for making the screen self-cleaning.

9. The distilling apparatus of claim 1 wherein the outside, bottom surface of the boiler is dark colored to reduce heat loss.

10. The distilling apparatus of claim 1 wherein the outside, bottom surface of the boiler is substantially concave.

11. A water-cooled distilling apparatus for forming purified water from boiling raw water, said water-cooled distilling apparatus comprising:
   a boiler for containing and boiling said raw water therein;
   a cooling tray assembly placed over said boiler, said cooling tray assembly having at least one coolant water reservoir and at least one distillate collection tray;
   a steam passageway formed between said boiler and said cooling tray assembly for directing steam from said boiling raw water in said boiler through said steam passageway and into said cooling tray assembly;
   a condensing area formed within said cooling tray assembly between said cooling water reservoir and said distillate collection tray;
   a deflector in said condensing area, said deflector having upper and lower surfaces wherein said lower surface has an inverted, substantially V-shape, said lower surface directing said steam substantially along a predetermined path into and through said condensing area to facilitate collection of said steam on the bottom surface of said coolant water reservoir, and
   at least one turbulence rim on the outer perimeter of said cooling tray assembly to direct evaporation from said water coolant reservoir away from said cooling tray assembly into the ambient air around the cooling tray assembly.

12. The water-cooled distilling apparatus of claim 11 wherein the bottom surface of said coolant water reservoir extends substantially horizontally and has downwardly extending dimples thereon to enhance the formation of condensate drops on said dimples.

13. The water-cooled distilling apparatus of claim 12 wherein said dimpled bottom surface of said coolant water reservoir is sandblasted.

14. The water-cooled distilling apparatus of claim 11 wherein the bottom surface of said coolant water reservoir is sandblasted.

15. The water-cooled distilling apparatus of claim 11 wherein said distillate collection tray is downwardly sloped toward the steam passageway.

16. The water-cooled distilling apparatus of claim 11 wherein said coolant water reservoir is upwardly sloped toward the steam passageway.

17. The water-cooled distilling apparatus of claim 11 further including a baffle within said coolant water reservoir.

18. A water-cooled distilling apparatus for forming purified water from boiling raw water, said water-cooled distilling apparatus comprising:
   a boiler for containing and boiling said raw water therein;
   a cooling tray assembly placed over said boiler, said cooling tray assembly having at least one coolant water reservoir and at least one distillate collection tray;
   a steam passageway formed between said boiler and said cooling tray assembly for directing steam from said boiling raw water in said boiler through said steam passageway and into said cooling tray assembly;
   a condensing area formed within said cooling tray assembly between said cooling water reservoir and said distillate collection tray; and
   an inverted, substantially V-shaped deflector in said condensing area, said deflector directing said steam substantially along a predetermined path into and through said condensing area to facilitate collection of said steam on the bottom surface of said coolant water reservoir wherein said coolant water reservoir is sloped upwardly toward said steam passageway and includes a baffle therein wherein said baffle has at least two members pivotally attached to each other to substantially conform said baffle to the upward slope of said coolant water reservoir.

19. The water-cooled distilling apparatus of claim 17 wherein said baffle is a fill-depth guide.

20. The water-cooled distilling apparatus of claim 11 includes means operable to produce said purified water substantially at a one-to-one ratio relative to evaporation from said water coolant reservoir.

21. The water-cooled distilling apparatus of claim 11 wherein said steam is directed into said condensing area to condense on the bottom surface of said coolant water reservoir and form said purified water thereon and said purified water is collected by said distillate collection tray, and wherein a steam vent is formed in the top of said cooling tray assembly and said water-cooled distilling apparatus further includes a cover for said steam vent, said cover having a rim with ridges formed about the perimeter of said cover, said rim forming a water seal for said steam vent when condensing steam fills said ridges between said cover and said steam vent, said cover opening to release steam through said steam vent when the pressure within said boiler and said cooling tray assembly exceeds a predetermined level.

22. A water-cooled distilling apparatus for forming purified water from raw water, said water-cooled distilling apparatus comprising:
- a boiler for containing said raw water therein and for boiling said raw water to form steam;
- a cooling tray assembly covering said boiler, said cooling tray assembly having at least one coolant water reservoir and at least one distillate collection tray;
- a steam passageway formed between said boiler and said cooling tray assembly for directing steam from said boiler into said cooling tray assembly, said steam condensing on said bottom surface of said coolant water reservoir to form said purified water, said purified water dripping onto said distillate collection tray, said distillate collection tray having a substantially annularly shaped surface sloping downwardly from the outer perimeter thereof to the inner perimeter thereof, said inner perimeter defining a centrally located, outlet opening for said purified water;
- a collection cup placed beneath the centrally located, outlet opening of said distillate collection tray between said boiler and said cooling tray assembly to collect said purified water from said distillate collection tray, said collection cup being donut-shaped;
- a distillate collection vessel adjacent said boiler; and
- a transfer pipe extending from said collection cup to said collection vessel, said purified water flowing from said collection cup through said transfer pipe into said distillate collection vessel.

23. The water-cooled distilling apparatus of claim 22 including means for flowing the purified water into the collection vessel at a minimum of about 160° F.

24. The water-cooled distilling apparatus of claim 22 wherein said cooling tray assembly has at least two coolant water reservoirs stacked above one another.

25. The water-cooled distilling apparatus of claim 22 wherein said cooling tray assembly has at least two distillate collection trays stacked above one another.

26. The water-cooled distilling apparatus of claim 22 wherein said cooling tray assembly has at least three coolant water reservoirs and three distillate collection trays respectively stacked above one another.

27. The water-cooled distilling apparatus of claim 22 wherein said cooling tray assembly is removable as a single unit from said boiler.

28. The water-cooled distilling apparatus of claim 22 wherein said boiler further includes a fill spout in the side thereof for filling said boiler with raw water during operation.

29. The water-cooled distilling apparatus of claim 22 further comprising a water trap in said transfer pipe.

30. The water-cooled distilling apparatus of claim 22 further including a fill alarm for indicating said purified water in said distillate collection vessel has reached a predetermined level.

31. The water-cooled distilling apparatus of claim 30 wherein said fill alarm is a music box with a floatation device for triggering said music box.

32. A water-cooled distilling apparatus for forming purified water from boiling raw water, said water-cooled distilling apparatus comprising:
- a boiler for containing and boiling said raw water therein;
- a cooling tray assembly placed over said boiler, said cooling tray assembly having at least one coolant water reservoir and at least one distillate collection tray;
- a steam passageway formed through said cooling tray assembly for directing steam from said boiling raw water in said boiler through said steam passageway and into said cooling tray assembly;
- a steam vent formed at the top of said steam passageway, said steam vent substantially centered over said cooling tray assembly so that evaporation from said coolant water reservoir is directed away from said steam vent; and
- a cover for said steam vent, said cover having a rim with ridges formed about the perimeter of said cover, said rim forming a water seal for said steam vent when condensing steam fills said ridges between said cover and said steam vent, said cover opening to release steam through said steam vent when the pressure within said boiler and said cooling tray assembly exceeds a predetermined level.

33. The water-cooled distilling apparatus of claim including means for allowing said water seal to break around said cover to let ambient air into said steam passageway through said steam vent when a vacuum is created therein.

34. The water-cooled distilling apparatus of claim 32 wherein said cooling tray assembly includes at least two coolant water reservoirs and at least two distillate collection trays respectively stacked above one another.

35. A water-cooled distilling apparatus for forming purified water from boiling raw water, said water-cooled distilling apparatus comprising:
- a boiler for containing and boiling said raw water therein;
- a cooling tray assembly placed over said boiler, said cooling tray assembly having at least one coolant water reservoir and at least one distillate collection tray; and
- a baffle within said coolant water reservoir to reduce spillage when said cooling tray assembly is moved, said baffle having a plurality of members pivotally attached to one another wherein said baffle is adjustable to conform to said coolant water reservoir.

36. A water-cooled distilling apparatus for forming purified water from boiling raw water, said water-cooled distilling apparatus comprising:
- a boiler for containing and boiling said raw water therein;
- a cooling tray assembly placed over said boiler, said cooling tray assembly having at least one coolant water reservoir with a sloped bottom and at least one distillate collection tray; and
- a baffle within said coolant water reservoir to reduce spillage when said cooling tray assembly is moved wherein said baffle has at least two members pivotally attached to each other to substantially conform said baffle to the sloped bottom of said coolant water reservoir.

37. The water-cooled distilling apparatus of claim 35 wherein said baffle serves as a fill-depth guide.

38. The water-cooled distilling apparatus of claim 35 wherein said cooling tray assembly includes at least two coolant water reservoirs and at least two distillate collection trays respectively stacked above one another.

39. A water-cooled distilling apparatus for forming purified water from raw water, said water-cooled distilling apparatus comprising:
- a boiler for containing said raw water therein and for boiling said raw water to form steam;
- a cooling tray assembly covering said boiler, said cooling tray assembly having at least one coolant water reservoir, said steam condensing on said coolant water reservoir causing evaporation of the coolant water therefrom and forming said purified water; and
- a turbulence rim about the perimeter of said coolant water reservoir for directing the evaporation in said coolant water reservoir away from said cooling tray assembly into the ambient air around the cooling tray assembly.

40. The water-cooled distilling apparatus of claim 39 wherein said cooling tray assembly includes at least two coolant water reservoirs and at least two distillate collection trays respectively stacked above one another.

* * * * *